(12) United States Patent
Togino

(10) Patent No.: US 7,245,443 B2
(45) Date of Patent: Jul. 17, 2007

(54) PANORAMIC ATTACHMENT OPTICAL SYSTEM, AND PANORAMIC OPTICAL SYSTEM

(75) Inventor: Takayoshi Togino, Koganei (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/204,178

(22) Filed: Aug. 16, 2005

(65) Prior Publication Data

US 2006/0114575 A1 Jun. 1, 2006

(30) Foreign Application Priority Data

Aug. 17, 2004 (JP) ............... 2004-237184
Feb. 3, 2005 (JP) ............... 2005-027823

(51) Int. Cl.
*G02B 13/06* (2006.01)
*G02B 17/00* (2006.01)
*H04N 7/00* (2006.01)

(52) U.S. Cl. ............... 359/725; 359/726; 359/727; 359/729; 348/36

(58) Field of Classification Search ........ 359/725–727, 359/730, 731, 733–736, 672, 673, 675; 348/36
See application file for complete search history.

(56) References Cited

U.S. PATENT DOCUMENTS

| 3,283,653 | A | 11/1966 | Tokarzewski |
| 3,505,465 | A | 4/1970 | Rees |
| 4,566,763 | A | 1/1986 | Greguss |
| 4,976,524 | A | 12/1990 | Chiba |
| 5,473,474 | A | 12/1995 | Powell |
| 5,631,778 | A | 5/1997 | Powell |
| 6,115,193 | A | 9/2000 | Shu |
| 6,175,454 | B1 * | 1/2001 | Hoogland et al. .......... 359/725 |
| 6,222,683 | B1 | 4/2001 | Hoogland et al. |
| 6,597,520 | B2 | 7/2003 | Wallerstein et al. |
| 6,611,282 | B1 | 8/2003 | Trubko et al. |

FOREIGN PATENT DOCUMENTS

JP 2103010 4/1990

(Continued)

*Primary Examiner*—Scott J. Sugarman
*Assistant Examiner*—Jack Dinh
(74) *Attorney, Agent, or Firm*—Pillsbury Winthrop Shaw Pittman LLP

(57) ABSTRACT

The invention relates to a panoramic attachment optical system and a panoramic optical system for taking an image having a full 360°-direction angle of view or projecting an image at a full 360°-direction angle of view. These optical systems are reduced in size and flare light and improved in resolving power. A panoramic attachment optical system 10 attached to the entrance side of an image-formation lens 20 to form a full 360°-direction image on an image plane 30 comprises a transparent medium that is rotationally symmetric about a center axis 1 and includes at least two internal reflecting surfaces 12, 13 and at least two refracting surfaces 11, 14. A light beam enters the transparent medium via the refracting surface 11, and reflects at the internal reflecting surfaces 12 and 13 in this order to leave the transparent medium via the refracting surface 14, forming an image at a position of the image plane 30 off the center axis 1 via an image-formation lens 20. The internal reflecting surfaces and the refracting surfaces are each of shape rotationally symmetric about the center axis 1, and a light beam 2 coming from far way forms an image at least one time.

18 Claims, 24 Drawing Sheets

FOREIGN PATENT DOCUMENTS

| | | |
|---|---|---|
| JP | 11-183637 | 7/1999 |
| JP | 11-331654 | 11/1999 |
| JP | 2002-162567 | 6/2002 |
| JP | 2002-196438 | 7/2002 |
| JP | 2002-233494 | 8/2002 |
| JP | 2003-167195 | 6/2003 |

* cited by examiner

PANORAMIC ATTACHMENT OPTICAL SYSTEM, AND PANORAMIC OPTICAL SYSTEM

This application claims the benefits of Japanese Application No. 2004-237184, filed in Japan on Aug. 17, 2004, and Japanese Application No. 2005-27823, filed in Japan on Feb. 3, 2005, the contents of both of which are incorporate herein by reference in their entireties.

BACKGROUND OF THE INVENTION

The present invention relates generally to a panoramic attachment optical system and a panoramic optical system, and more specifically to a panoramic attachment optical system and a panoramic optical system, each of small-format size and high resolving power, which are well suited for use on all sky cameras, all sky projectors, etc., designed to form on an image plane an image having a full 360°-direction angle of view or project an image located on an image plane at a full 360°-direction angle of view.

BACKGROUND OF THE INVENTION

So far, optical systems designed to obtain full 360°-direction (full-panoramic) images by imaging optical systems combined with convex mirrors, rotating elliptic mirrors and rotating parabolic mirrors have been put forward in the following patent publications 1 to 7, etc. What is known as "Chameleon Eye®", Sony Corp., has also been available.

Among prior optical systems using a reflection optical system to obtain full 360°-direction (full-panoramic) images, there is one made up of a front unit comprising a transparent medium that is rotationally symmetric about a center axis and includes two internal reflecting surfaces and two transmitting surfaces and a rear unit that is rotationally symmetric about the center axis and has positive power, as set forth in patent publications 8 and 9.

Patent Publication 1
JP(A) 11-331654
Patent Publication 2
JP(A) 2002-162567
Patent Publication 3
JP(A) 2002-196438
Patent Publication 4
JP(A) 2003-167195
Patent Publication 5
Japanese Patent No. 2925573
Patent Publication 6
JP(A) 11-183637
Patent Publication 7
JP(A) 2002-233494
Patent Publication 8
U.S. Pat. No. 4,566,763
Patent Publication 9
U.S. Pat. No. 5,473,474

A problem with any of the prior optical systems proposed in patent publications 1 to 7, etc. is that the reflecting optical system becomes bulky.

A problem with "Chameleon Eye" is that when full-panoramic images are picked up with the optical system directing to the zenith, much harmful flare light coming from the zenithal direction causes image quality to go worse. Another problem is that because positive power and negative power are given to the reflecting surfaces in order from the object side, the optical system is unavoidably of the telephoto type where the focal length is generally long with respect to the total length; the reflecting optical system becomes bulky as a result of the inability to reduce the total length.

A problem with either of patent publications 8 and 9 is that when full-panoramic images are picked up with the optical system directing to the zenith, much harmful flare light coming from the zenithal direction causes image quality to become worse, because the effective diameter of the first transmitting surface becomes large as a consequence of the entrance pupil in a section including the center axis being apart from the first transmitting (entrance) surface.

Such being the case, the primary object of the invention is to provide a panoramic attachment optical system and a panoramic optical system for taking an image having a full 360°-direction (full-panoramic) angle of view or projecting an image at a full 360°-direction (full-panoramic) angle of view, which have decreased size, minimized flare light and improved resolving power.

SUMMARY OF THE INVENTION

According to the invention, the above object is achieved by the provision of a panoramic attachment optical system, which is attached to an entrance side of an image-formation lens having positive power or an exit side of a projection lens having positive power to form a full 360°-direction image on an image plane or project an image located on an image plane in a full 360° direction, characterized in that:

said panoramic attachment optical system comprises a transparent medium that is rotationally symmetric about a center axis and includes at least two internal reflecting surfaces and at least two refracting surfaces, wherein a light beam enters said transparent medium via an entrance-side refracting surface in order of travel of a light ray in the case of an image-formation optical system, and oppositely to the order of travel of a light ray in the case of a projection optical system, and reflects successively at said internal reflecting surfaces to leave said transparent medium via an exit-side refracting surface, forming an image at a position of said image plane off said center axis via said image-formation lens or said projection lens, said internal reflecting surfaces and said refracting surfaces are each of shape rotationally symmetric about said center axis, and a light beam coming from far away forms an image at least one time in a section including said center axis, and at least one time in a plane that is orthogonal to said section and includes a center light ray of said light beam as well.

In one embodiment of the invention, at least one internal reflecting surface is of rotationally symmetric shape obtained by rotation about said center axis of a line segment that has no plane of symmetry and is of any shape, or at least one internal reflecting surface is of rotationally symmetric shape obtained by rotation about said center axis of a line segment that includes an odd-number order term, as expressed by a polynomial, and is of any shape.

Preferably, the center ray of the light beam coming from far away has an angle of incidence of 45 or smaller on any of said internal reflecting surfaces.

Preferably, said image-formation lens or said projection lens and a pupil-formation aperture are located coaxially with said center axis.

Preferably, it is desired to satisfy condition (1):

$$5 < |A/B| \tag{1}$$

where A is an optical path length between the position of the entrance pupil that is an image of said pupil-formation aperture and said pupil-formation aperture, and B is an optical path length between said entrance surface and said position of the entrance pupil.

It is also desired to satisfy condition (2):

$$0.2 < Fx/Fy < 2.0 \qquad (2)$$

where Fx and Fy are the focal lengths of the whole panoramic attachment optical system in the X-direction and Y-direction, respectively, provided that on said image plane, the Y-direction is defined by a direction of a plane including said center axis and the X-direction is defined by a direction orthogonal to said plane.

The invention also provides a panoramic optical system for forming an image having a full 360°-direction angle of view on an image plane or projecting an image located on the image plane at a full 360°-direction angle of view, characterized in that:

said panoramic optical system comprises a front unit comprising a transparent medium rotationally symmetric about a center axis and including at least two reflecting surfaces and two transmitting surfaces, and a rear unit that is rotationally symmetric about the center axis and has positive refracting power, said front unit includes a first transmitting surface on which a light beam coming from far away is incident in order of travel of light rays in the case of an image-formation system, and oppositely to the order of travel of light rays in the case of a projection system, a first reflecting surface opposite to said first transmitting surface with said center axis interposed therebetween, a second reflecting surface located on the same side as said first reflecting surface and a second transmitting surface that faces said rear unit, wherein the center of said first reflecting surface is positioned nearer to said rear unit side than the center of said second reflecting surface as viewed in a center axis direction, and a light beam coming from far away enters said front unit and said rear unit in this order, forming an image at a position of an image plane off said center axis, wherein in a section including said center axis, an entrance pupil is positioned at or near said first transmitting surface and in a plane that is orthogonal to said section including said center axis and includes the center light ray of said light beam, said entrance pupil is positioned on said center axis.

In this case, at any position of the image plane side with respect to said front unit, there could be provided an aperture located coaxially to the center axis.

At or near said first transmitting surface in said front unit, there could be provided a zonal slit aperture rotationally symmetric about the center axis.

Preferably, at least one internal reflecting surface is of rotationally symmetric shape obtained by rotation about the center axis of a line segment that has no plane of symmetry and is of any shape.

Alternatively, at least one internal reflecting surface could be of rotationally symmetric shape obtained by rotation about said center axis of a line segment that includes an odd-number order term and is of any shape.

Preferably, a flare stop for limiting an aperture only in the section including the center axis is located at or near the entrance pupil in the section including the center axis.

Preferably, the rear unit comprises a rotationally symmetric, co-axial refracting optical system.

Preferably, it is desired to satisfy condition (3):

$$F_{fy}/F_{fx} < 0.95 \qquad (3)$$

where $F_{fy}$ is the focal length of the front unit in the plane including the center axis, and $F_{fx}$ is the focal length of the front unit in the plane orthogonal to the center axis.

It is also desired to satisfy condition (7):

$$5 < |A/B| \qquad (7)$$

where, in the section including the center axis, A is an optical path length from the position of the entrance pupil to a stop position, and B is an optical path length from the position of the entrance pupil to the first transmitting surface in the front unit provided that a light ray direction is positive.

It is further desired to satisfy condition (8):

$$0.1 < C/D < 10 \qquad (8)$$

where, in the section including the center axis, C is a distance of the entrance pupil from the center axis and D is a distance of the flare stop from the center axis.

In the invention, at least the transparent medium could be cut along the section including the center axis so that the angle of view around the center axis is narrower than 360°.

With the embodiments of the invention as recited above, it is possible to obtain a panoramic attachment optical system and a panoramic optical system for obtaining an image having a full 360°-direction (full-panoramic) image or projecting an image at a full 360°-angle of view, which are not affected by flare light and reduced in size, and have well corrected aberrations and high resolving power.

Still other objects and advantages of the invention will in part be obvious and will in part be apparent from the specification.

The invention accordingly comprises the features of construction, combinations of elements, and arrangement of parts which will be exemplified in the construction set forth, and the scope of the invention will be indicated in the claims.

DESCRIPTION OF THE PREFERRED EMBODIMENTS

The panoramic attachment optical system of the invention is now explained with reference to some specific examples.

Figure 1:
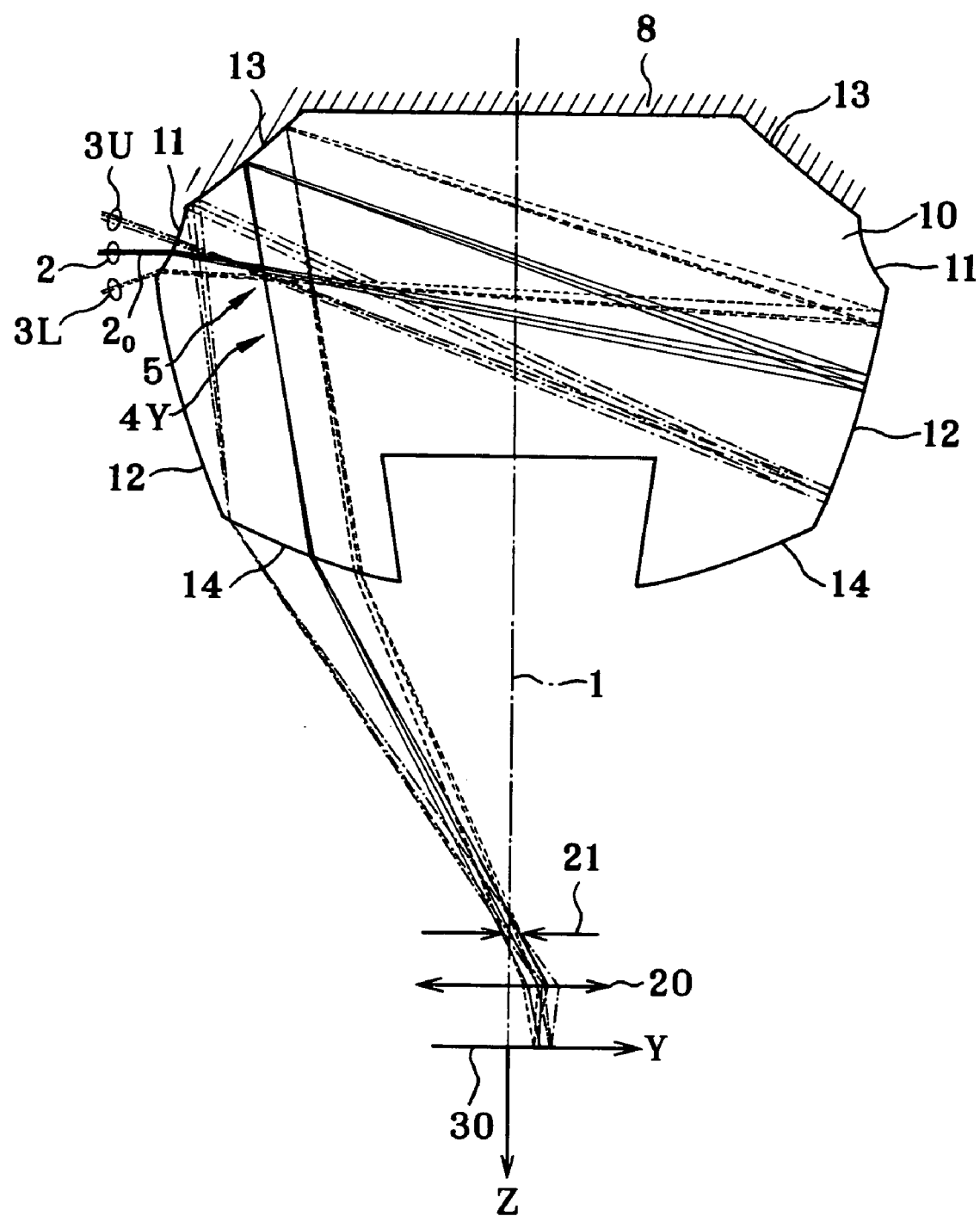
FIG. 1 is a Y-Z sectional view including an axis of rotational symmetry, showing the panoramic attachment optical system according to Example 1 of the invention, as attached to the entrance side of an image-formation lens.
Figure 2:
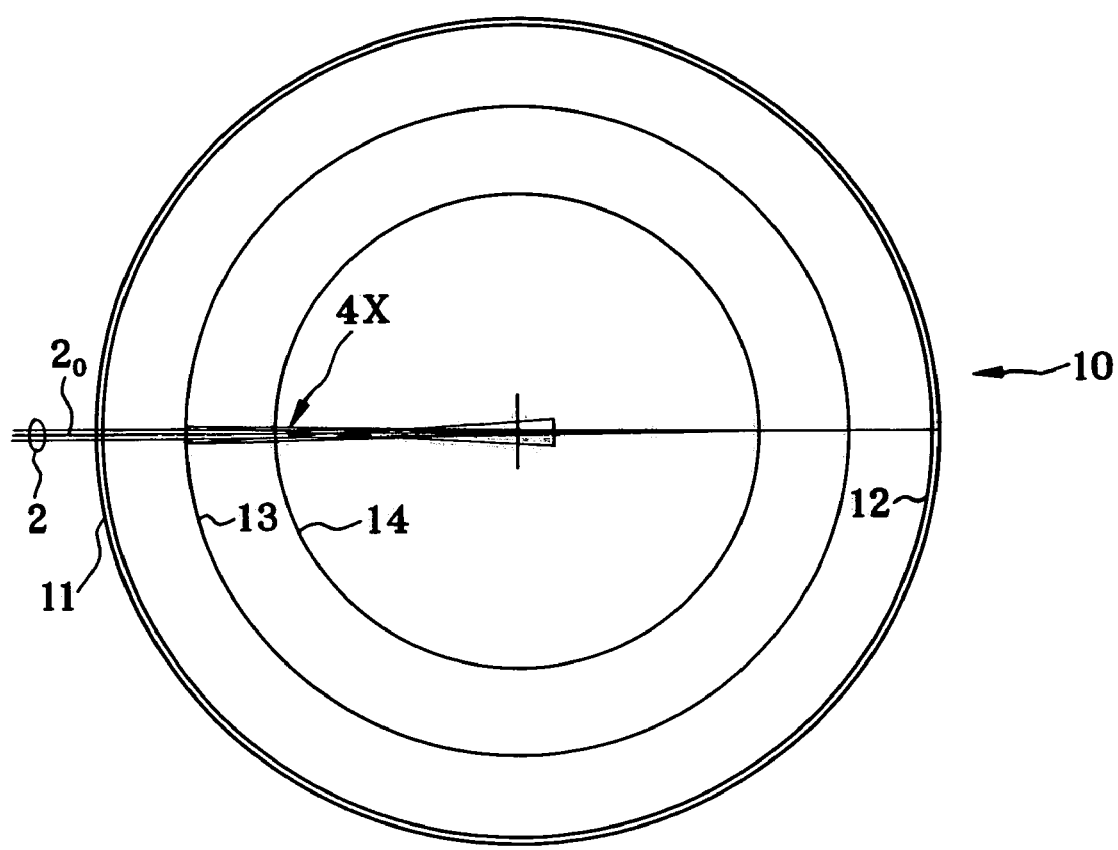
FIG. 2 is a plan view of an optical path through the panoramic attachment optical system of Example 1.

FIG. 1 is a sectional view of the panoramic attachment optical system according to Example 1, described later, taken along the center axis (the axis of rotational symmetry), as attached to the entrance side of an image-formation lens (ideal lens), and FIG. 2 is a plan view of an optical path through the panoramic attachment optical system. The panoramic attachment optical system of the invention is now explained more specifically with reference to FIGS. 1 and 2.

A panoramic attachment optical system 10 of the invention is attached to the entrance side of an image-formation lens 20 to form, for instance, a full 360°-direction (full-panoramic) image on an image plane 30 for capturing that image. The panoramic attachment optical system 10 is made up of a transparent medium rotationally symmetric about a center axis 1, and includes two internal reflecting surfaces 12, 13 and two refracting surfaces 11, 14. As the center axis 1 lies in the vertical direction, it allows a center light beam 2 coming from far away in the horizontal direction to enter the transparent medium of the panoramic attachment optical system 10 via the refracting surface 11 that is an entrance surface, reflect at the internal reflecting surfaces 12 and 13 in this order, leaving the panoramic attachment optical system 10 through the refracting surface 14 that is an exit surface, and enter the image-formation lens 20 via a stop 21, forming an image at a radially given position of the image plane 30 off the center axis 1. The panoramic attachment optical system 10 is of rotationally symmetric shape about the center axis 1, and this goes for the refracting surfaces 11, 14 and the internal reflecting surfaces 12, 13, too.

The panoramic attachment optical system 10 of the invention is designed such that the light beams 2, 3U and 3L coming from far away (3U is a light beam coming from a distant place in the sky and 3L is a light beam coming from a distant place on the ground) form an image at least one time in a section including the axis 1 of rotational symmetry in FIG. 1 (in the embodiment of FIG. 1 they form an image one time at or near a position 4Y in the transparent medium), and they also form an image at least one time in a plane (FIG. 2) that is orthogonal to that section and includes a center light ray $2_0$ of the center light beam 2 (in the embodiment of FIG. 2, the image is formed one time at or near a position 4X in the transparent medium). Thus, because there is at least one image-formation by the light beams 2, 3U and 3L coming from far away so that the image (entrance pupil) of the stop 21 for the image-formation lens 20, too, is formed in or near the panoramic attachment optical system 10 (in the embodiment of FIG. 1, that image is formed at or near a position 5 in the transparent medium), the diameter of the light beams in the panoramic attachment optical system 10 can be reduced good enough to reduce the effective diameter per se of the panoramic attachment optical system 10.

In addition, it is possible to form the image (entrance pupil) of the stop 21 for the image-formation lens 20 at or near the entrance surface 11 of the panoramic attachment optical system 10, to keep flare or ghost-inducing unnecessary light against entering the panoramic attachment optical system 10 from above in a direction primarily along the axis 1 of rotational symmetry, and to view or pickup up an image with reduced flares.

With a back-surface mirror applied as the internal reflecting surface 12 in the panoramic attachment optical system 10 of the invention, it is possible to minimize the amount of aberrations produced.

It is preferable to set the angle of incidence of light on each internal reflecting surface 12, 13 at 45° or smaller because decentration aberrations are likely to occur at the internal reflecting surfaces 12 and 13.

Examples 1 to 3 of the panoramic attachment optical system according to the invention are now explained; however, their constructional parameters will be given later. Those constructional parameters have been determined on the results of normal ray tracing from an object plane at infinity to the image plane 30 via the panoramic attachment optical system 10 and the image-formation lens 20 comprising an ideal lens, as typically illustrated in FIG. 1.

Now assume that, in normal ray tracing as shown typically in FIG. 1, the origin of a decentered optical surface in a decentered optical system is defined by the center of the image plane 30, the Z-axis positive direction is defined by a direction of the axis 1 of rotational symmetry (center axis) along the direction of propagation of light, and the Y-Z plane is defined by the paper plane of FIG. 1. Further, the Y-axis positive direction is defined by the direction of travel of light from an infinite object surface in the paper plane of FIG. 1, and the X-axis positive direction is defined by an axis that forms with the Y- and Z-axes a right-handed orthogonal coordinate system.

For a decentered surface are the amount of decentration from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive for $\alpha$ and $\beta$ mean counterclockwise rotation with respect to the positive directions of the respective axes, and the positive for γ means clockwise rotation with respect to the positive direction of the Z-axis. Referring here to how to perform α-, β- and γ-rotations of the center axis of the surface, the coordinate system that defines each surface is first α-rotated counterclockwise about the X-axis of the coordinate system that is defined at the origin of the optical system. Then, the coordinate system is β-rotated counterclockwise about the Y-axis of the rotated new coordinate system. Finally, the coordinate system is γ-rotated clockwise about the Z-axis of the rotated new another coordinate system.

A Y-rotation free-form surface is here defined by the following defining formula (a).

$$R(Y) = C_1 + C_2 Y^2 + C_3 Y^2 + C_4 Y^3 + C_5 Y^4 + C_6 Y^5 + C_7 Y^6 + \ldots + C_{21} Y^{20} + \ldots C_{n+1} Y^n$$

$$Z = \pm R(Y) \{1 - [X/R(Y)]^2\}^{1/2} \quad \text{(a)}$$

This Y-rotation free-form surface is a rotationally symmetric surface that is obtained by rotation of the curve R(Y) about the Y-axis. As a result, that surface becomes a free-form surface (free-form curve) in the Y-Z plane, and a circle with a radius $|C_1|$ in the X-Z plane, respectively.

In the panoramic attachment optical system 10 of the invention, at least one of the internal reflecting surfaces 12 and 13 is composed of such a Y-rotation free-form surface that is of rotationally symmetric shape obtained by rotation about the center axis 1 of a line segment of any shape that includes at least an odd-number order term, as expressed by a polynomial, and has no plane of symmetry. By allowing at least one internal reflecting surface to have such a surface shape, it is possible to make correction for decentration aberrations that occur unavoidably with a reflecting optical system. It is thus possible to provide a panoramic attachment optical system having even higher resolving power and reduce the size of that optical system.

EXAMPLE 1

FIG. 1 is a Y-Z sectional view including an axis 1 of rotational symmetry (center axis) of a panoramic attachment optical system 10, as attached to the entrance side of an image-formation lens (ideal lens) 20, and FIG. 2 is a plan view of an optical path through the panoramic attachment optical system 10.

The panoramic attachment optical system 10 is attached to the entrance side of the image-formation lens 20 composed of an ideal lens to form on an image plane 30 an image, for instance, a full 360°-direction (full-panoramic) image in the form of a circle whose zenithal direction lies away from the center of the image and whose horizon lies inside. The panoramic attachment optical system is made up of a transparent medium having two internal reflecting surfaces 12 and 13 that are each rotationally symmetric about the center axis 1 and composed of a Y-rotation free-form surface, an entrance (refracting) surface 11 composed of a Y-rotation free-form surface and an exit (refracting) surface 14 composed of a spherical surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, goes across the center axis 1, and reflects at the internal reflecting surface 12 opposite to the entrance surface 11. The reflected light again reflects at the internal reflecting surface 13 on the same side as the entrance surface 11, leaving the panoramic attachment optical system 10 through the exit refracting surface 13, whereupon the light forms an image at a radially given position of the image plane 30 off the center axis 1 via a stop 21 for the image-formation lens 20.

This example, wherein the second reflecting surface 13 and the first reflecting surface 12 are located on the opposite sides of the center axis 1, is preferable for correction of aberrations, because the whole optical path length can be increased when they are of the same size. Further, location of the entrance pupil 5 at or near the first surface 11 that is the transmitting surface ensures to decrease the effective diameter of the first surface 11 and, hence, minimize the entrance in the optical system of unnecessary light attributable to flare light. Furthermore, the angle of incidence of light rays on the first reflecting surface 12 is kept so small that decentration aberrations occurring at that surface can be minimized.

In this example, decentration aberrations are corrected by the Y-rotation free-form surfaces used for the entrance surface 11 and both the internal reflecting surfaces 12 and 13.

In the instance panoramic attachment optical system 10, if a shading absorption film 8 is applied over the second reflecting surface 13 on the zenithal side and a non-optical surface across it, unnecessary light incident from the zenithal side along the axis 1 of rotational symmetry to yield flares or ghosts is so cut off that an image with much more reduced flares can be observed (captured).

The specifications of Example 1 are:
Focal length of the ideal lens 20: 3.5 mm,
Horizontal angle of view: 360°,
Vertical angle of view: ±20°.
Entrance pupil diameter: 0.57 mm, and
Image size: φ3.18 to φ5.34 mm.

EXAMPLE 2

Figure 3:
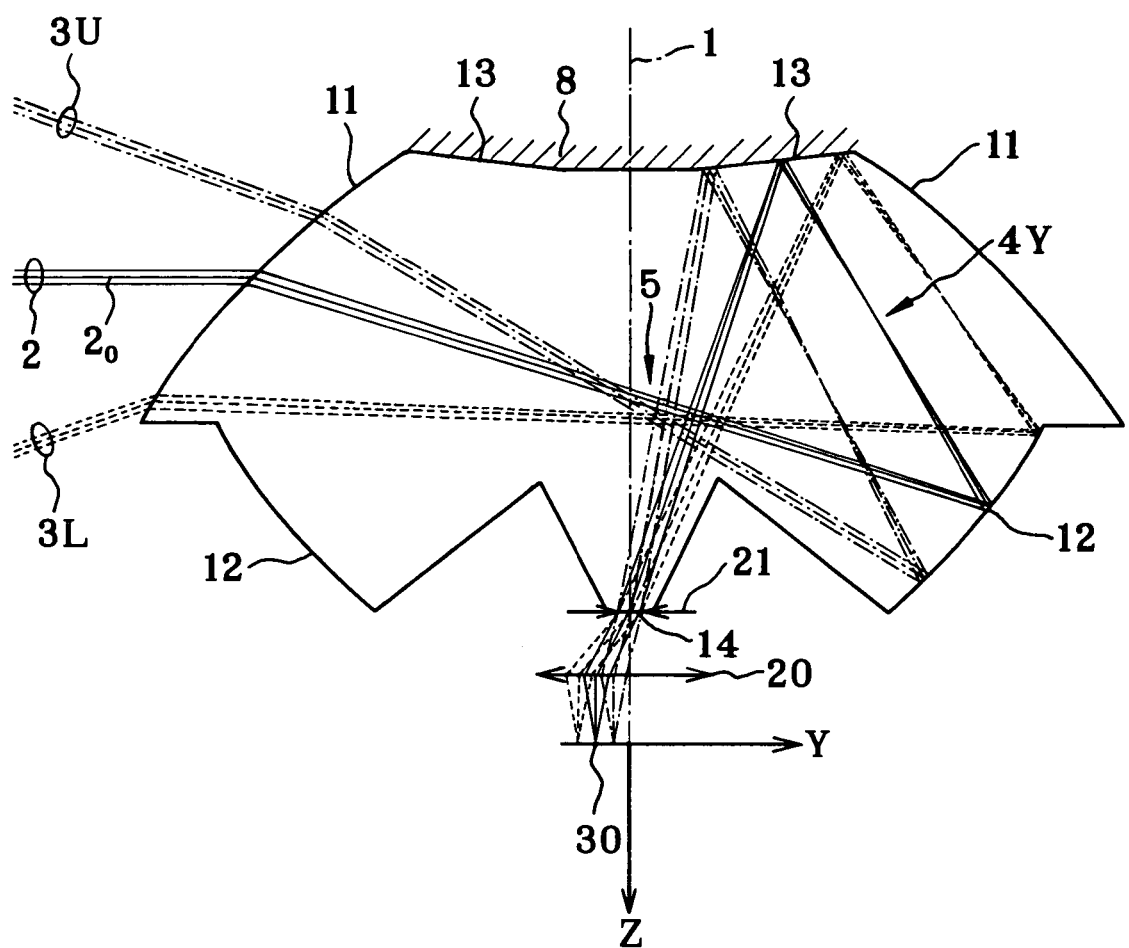
FIG. 3 is a view, as in FIG. 1, but with the panoramic attachment optical system of Example 2 according to the invention.
Figure 4:
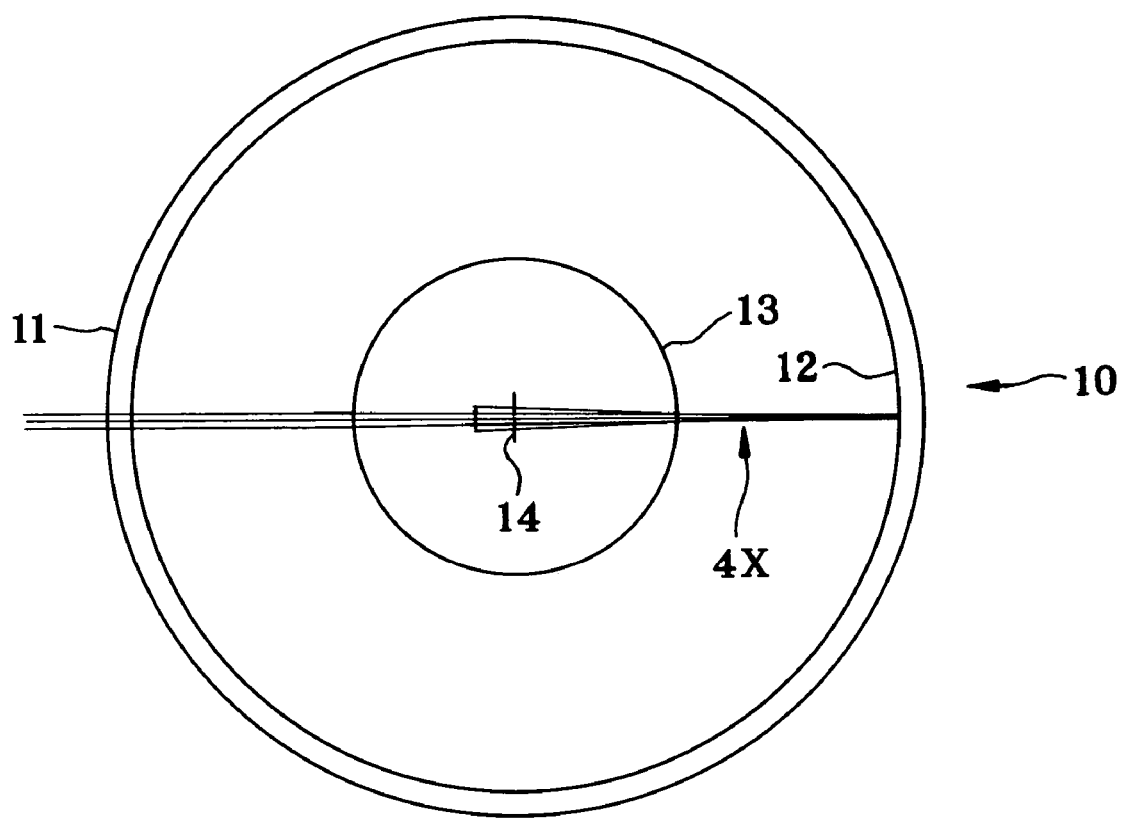
FIG. 4 is a view, as in FIG. 2, but with the panoramic attachment optical system of Example 2.

FIG. 3 is a Y-Z sectional view including an axis 1 of rotational symmetry (center axis) of a panoramic attachment optical system 10, as attached to the entrance side of an image-formation lens (ideal lens) 20, and FIG. 4 is a plan view of an optical path through the panoramic attachment optical system 10.

The panoramic attachment optical system 10 is attached to the entrance side of the image-formation lens 20 composed of an ideal lens to form on an image plane 30 an image, for instance, a full 360°-direction (full-panoramic) image in the form of a circle whose zenithal direction lies in the center direction of the image and whose horizon lies outside. The panoramic attachment optical system is made up of a transparent medium comprising two internal reflecting surfaces 12 and 13 that are each rotationally symmetric about the center axis 1 and composed of a Y-rotation free-form surface, an entrance (refracting) surface 11 composed of a Y-rotation free-form surface and an exit (refracting) surface 14 composed of a spherical surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, goes across the center axis 1, and reflects upwards at the internal reflecting surface 12 opposite to the entrance surface 11. The reflected light again reflects at the internal reflecting surface 13 on the same side as the internal reflecting surface 12 leaving the panoramic attachment optical system 10 through the exit refracting surface 14, whereupon the light forms an image at a radially given position of the image plane 30 off the center axis 1 via a stop 21 for the image-formation lens 20.

In this example, the whole optical path length is short because the second reflecting surface 13 is located oppositely to the transmitting entrance surface 11 (on the same side as the first reflecting surface 12) with the center axis 1 interposed between them, but yet light rays reflected at the first reflecting surface 12 and the second reflecting surface 13 can have substantially the same angle of 45° or smaller so that the occurrence of decentration aberrations in particular can be minimized.

In this example, decentration aberrations are corrected with the Y-rotation free-form surfaces used for the entrance surface 11 and both the internal reflecting surfaces 12 and 13.

In the panoramic attachment optical system 10 of the instant example, if a shading absorption film 8 is applied over the second reflecting surface 13 on the zenithal side of the transparent medium, it then ensures to cut off unnecessary light that is incident from the zenithal side along the axis 1 of rotational symmetry to yield flares or ghosts and observe (pick up) an image with much more reduced flares.

In the instant example, both the Y-direction powers of the two internal reflecting surfaces 12 and 13 are allowed to be so positive that a wide-angle arrangement with a shortened focal length is achievable. Even at the same angle of view, an increased image height is ensured so that the principal points of the panoramic attachment optical system 10 can be closer to the image-formation lens 20, resulting in further size reductions of the optical system, easier pupil relay in the Y-direction and easier achievement of high performance.

It is here to be noted that the X-direction power is determined on how the surfaces are located and so has a limited flexibility because of being rotationally symmetric with respect to the Y-axis. For this reason, the Y-direction power profile becomes more important.

The specifications of Example 2 are:
Focal length of the ideal lens 20: 3.5 mm,
Horizontal angle of view: 360°,
Vertical angle of view: ±20°,
Entrance pupil diameter: 0.58 mm, and
Image size: φ2.14 to φ6.02 mm.

EXAMPLE 3

Figure 5:
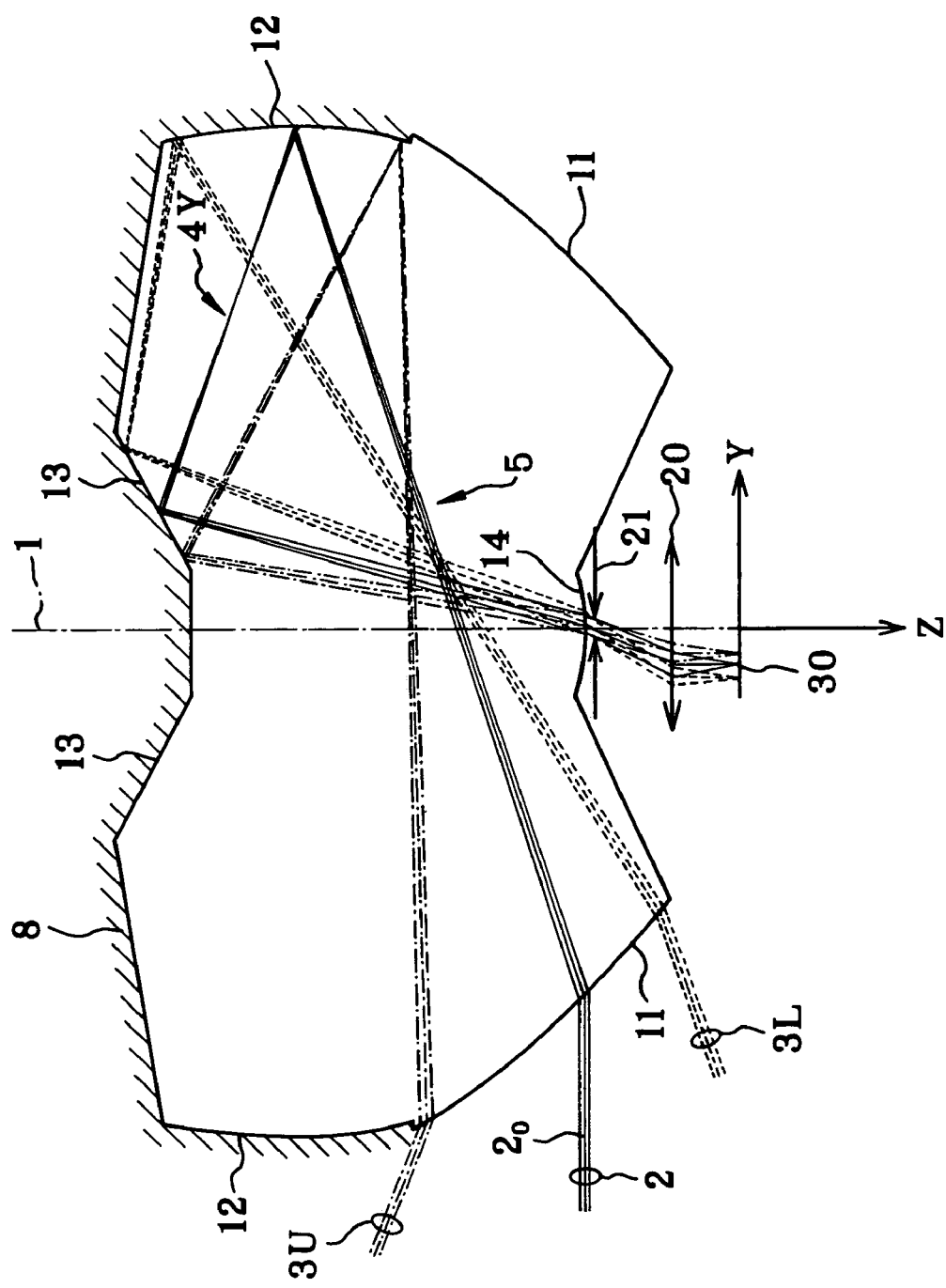
FIG. 5 is a view, as in FIG. 1, but with the panoramic attachment optical system of Example 3 according to the invention.
Figure 6:
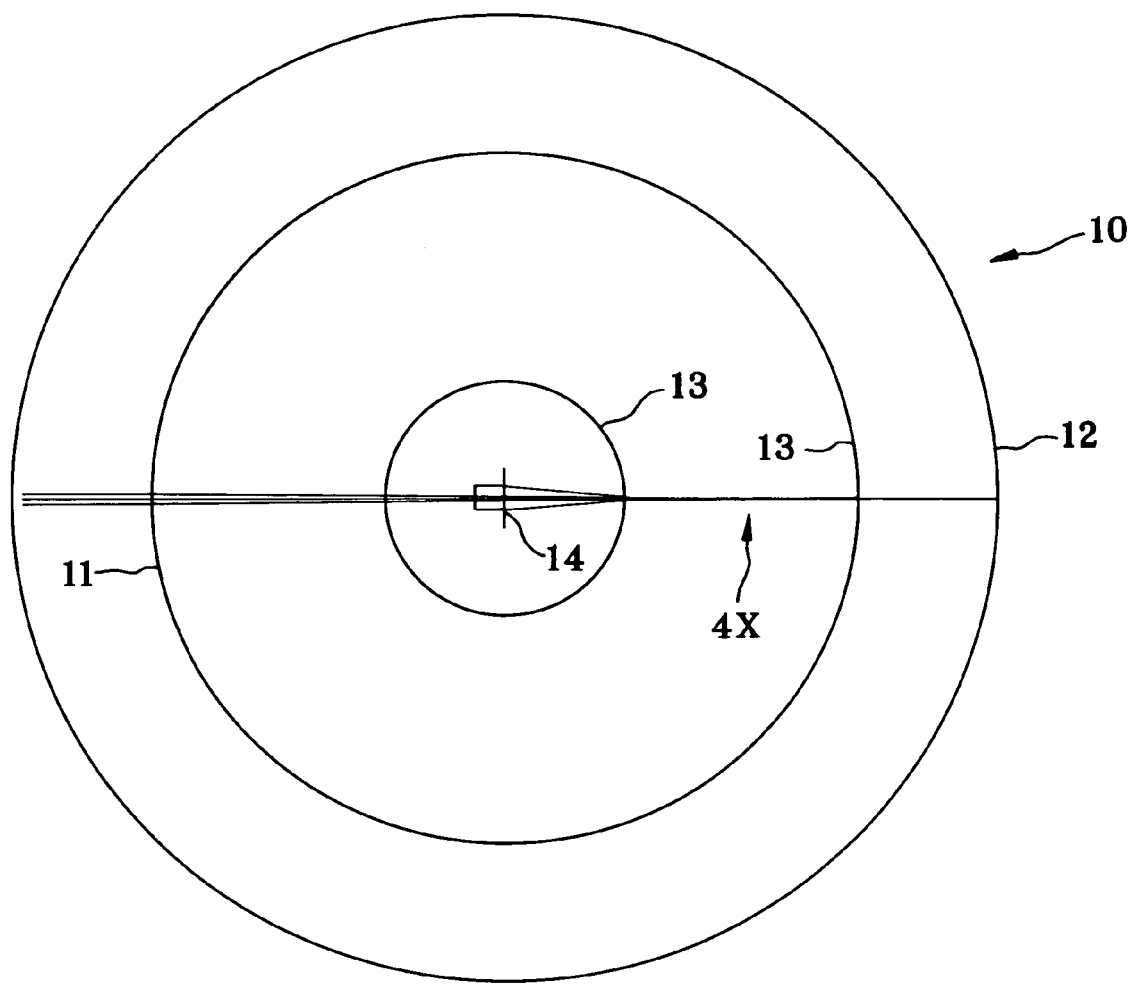
FIG. 6 is a view, as in FIG. 2, but with the panoramic attachment optical system of Example 3.

FIG. 5 is a Y-Z sectional view including an axis 1 of rotational symmetry (center axis) of a panoramic attachment optical system 10, as attached to the entrance side of an image-formation lens (ideal lens) 20, and FIG. 6 is a plan view of an optical path through the panoramic attachment optical system 10.

Being similar to Example 2, the panoramic attachment optical system 10 is attached to the entrance side of the image-formation lens 20 composed of an ideal lens to form on an image plane 30 an image, for instance, a full 360°-direction (full-panoramic) image in the form of a circle whose zenithal direction lies in the center direction of the image and whose horizon lies outside. The panoramic attachment optical system is made up of a transparent medium comprising two internal reflecting surfaces 12 and 13 that are each rotationally symmetric about the center axis 1 and composed of a Y-rotation free-form surface, an entrance (refracting) surface 11 composed of a Y-rotation free-form surface and an exit (refracting) surface 14 composed of a spherical surface. When the center axis 1 lies in the vertical direction and the panoramic attachment optical system 10 directs to the zenith, a center light beam 2 coming from far away in the horizontal direction enters the transparent medium that forms the panoramic attachment optical system 10 via the entrance refracting surface 11, goes across the center axis 1, and reflects upwards at the internal reflecting surface 12 opposite to the entrance surface 11. The reflected light again reflects at the internal reflecting surface 13 on the same side as the internal reflecting surface 12, leaving the panoramic attachment optical system 10 through the exit refracting surface 14, whereupon the light forms an image at a radially given position of the image plane 30 off the center axis 1 via a stop 21 for the image-formation lens 20.

In this example, the whole optical path length is short because the second reflecting surface 13 is located oppositely to the transmitting entrance surface 11 (on the same side as the first reflecting surface 12) with the center axis 1 interposed between them, but yet light rays reflected at the first reflecting surface 12 and the second reflecting surface 13 can have substantially the same angle of 45° or smaller so that the occurrence of decentration aberrations in particular can be minimized. Further, because the transmitting surface 11 that is the first surface is closer to the image plane 30 side than the first reflecting surface 12 and the second reflecting surface 13, the height of the optical system in the center axis 1 direction can be kept low.

In this example, decentration aberrations are corrected with the Y-rotation free-form surfaces used for the entrance surface 11 and both the internal reflecting surfaces 12 and 13.

In the panoramic attachment optical system 10 of the instant example, if a shading absorption film 8 is applied all over the zenithal side of the transparent medium from the entrance surface 11, it then ensures to cut off unnecessary light that is incident from the zenithal side along the axis 1 of rotational symmetry to yield flares or ghosts and observe (pick up) an image with much more reduced flares.

The specifications of Example 3 are:
Focal length of the ideal lens 20: 3.5 mm,
Horizontal angle of view: 360°,
Vertical angle of view: ±20°,
Entrance pupil diameter: 0.52 mm, and
Image size: φ2.17 to φ5.09 mm.

In what follows, the constitutional parameters of Examples 1, 2 and 3 will be given with the acronyms "YRFS", "IDL" and "RE" indicating a Y-rotation free-form surface, an ideal lens and a reflecting surface, respectively.

| | | Example 1 | | | |
|---|---|---|---|---|---|
| Surface No. | Radius of curvature | Surface separation | Displacement and tilt | Refractive index | Abbe's No. |
| Object plane | ∞(Object Plane) | | (1) | | |
| 1 | ∞(Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[3] (RE) | | (5) | 1.5163 | 64.1 |
| 5 | −42.01 | | (6) | | |
| 6 | ∞(Stop) | | (7) | | |
| 7 | IDL | | (8) | | |
| Image plane | ∞ | | | | |

-continued

YRFS[1]

| $C_1$ | $-2.3758 \times 10^{+1}$ | $C_2$ | $5.3748 \times 10^{-1}$ | $C_3$ | $-8.3939 \times 10^{-2}$ |
|---|---|---|---|---|---|

YRFS[2]

| $C_1$ | $2.3501 \times 10^{+1}$ | $C_2$ | $2.6380 \times 10^{-1}$ | $C_3$ | $-9.0150 \times 10^{-3}$ |
|---|---|---|---|---|---|

YRFS[3]

| $C_1$ | $-1.8844 \times 10^{+1}$ | $C_2$ | $1.1812$ | $C_3$ | $-1.1301 \times 10^{-2}$ |
|---|---|---|---|---|---|
| $C_4$ | $1.4163 \times 10^{-3}$ | | | | |

Displacement and tilt(1)

| X | 0.00 | Y | $-\infty$ | Z | $-53.96$ |
|---|---|---|---|---|---|
| $\alpha$ | 90.00 | $\beta$ | 0.00 | $\gamma$ | 0.00 |

Displacement and tilt(2)

| X | 0.00 | Y | $-21.11$ | Z | $-53.96$ |
|---|---|---|---|---|---|
| $\alpha$ | 90.00 | $\beta$ | 0.00 | $\gamma$ | 0.00 |

Displacement and tilt(3)

| X | 0.00 | Y | 0.00 | Z | $-53.96$ |
|---|---|---|---|---|---|
| $\alpha$ | 90.00 | $\beta$ | 0.00 | $\gamma$ | 0.00 |

Displacement and tilt(4)

| X | 0.00 | Y | 0.00 | Z | $-45.56$ |
|---|---|---|---|---|---|
| $\alpha$ | 90.00 | $\beta$ | 0.00 | $\gamma$ | 0.00 |

Displacement and tilt(5)

| X | 0.00 | Y | 0.00 | Z | $-60.52$ |
|---|---|---|---|---|---|
| $\alpha$ | 90.00 | $\beta$ | 0.00 | $\gamma$ | 0.00 |

Displacement and tilt(6)

| X | 0.00 | Y | 0.00 | Z | $-30.87$ |
|---|---|---|---|---|---|
| $\alpha$ | 0.00 | $\beta$ | 0.00 | $\gamma$ | 0.00 |

Displacement and tilt(7)

| X | 0.00 | Y | 0.00 | Z | $-7.63$ |
|---|---|---|---|---|---|
| $\alpha$ | 0.00 | $\beta$ | 0.00 | $\gamma$ | 0.00 |

Displacement and tilt(8)

| X | 0.00 | Y | 0.00 | Z | $-4.13$ |
|---|---|---|---|---|---|
| $\alpha$ | 0.00 | $\beta$ | 0.00 | $\gamma$ | 0.00 |

Example 2

| Surface No. | Radius of curvature | Surface separation | Displacement and tilt | Refractive index | Abbe's No. |
|---|---|---|---|---|---|
| Object plane | ∞(Object Plane) | | (1) | | |
| 1 | ∞(Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[3] (RE) | | (5) | 1.5163 | 64.1 |
| 5 | $-24.31$ | | (6) | | |
| 6 | ∞(Stop) | | (7) | | |
| 7 | IDL | | (8) | | |
| Image plane | ∞ | | | | |

YRFS[1]

| $C_1$ | $-1.7246 \times 10^{+1}$ | $C_2$ | $1.0027$ | $C_3$ | $2.3632 \times 10^{-2}$ |
|---|---|---|---|---|---|

YRFS[2]

| $C_1$ | $1.9894 \times 10^{+1}$ | $C_2$ | $7.9862 \times 10^{-1}$ | $C_3$ | $-3.2166 \times 10^{-2}$ |
|---|---|---|---|---|---|
| $C_4$ | $3.2172 \times 10^{-4}$ | | | | |

YRFS[3]

| $C_1$ | $9.1330$ | $C_2$ | $8.3697$ | $C_3$ | $1.8056$ |
|---|---|---|---|---|---|

Displacement and tilt(1)

| X | 0.00 | Y | $-\infty$ | Z | $-27.35$ |
|---|---|---|---|---|---|
| $\alpha$ | 90.00 | $\beta$ | 0.00 | $\gamma$ | 0.00 |

Displacement and tilt(2)

| X | 0.00 | Y | $-6.81$ | Z | $-27.35$ |
|---|---|---|---|---|---|
| $\alpha$ | 90.00 | $\beta$ | 0.00 | $\gamma$ | 0.00 |

Displacement and tilt(3)

| X | 0.00 | Y | 0.00 | Z | $-27.35$ |
|---|---|---|---|---|---|
| $\alpha$ | 90.00 | $\beta$ | 0.00 | $\gamma$ | 0.00 |

Displacement and tilt(4)

| X | 0.00 | Y | 0.00 | Z | $-15.80$ |
|---|---|---|---|---|---|
| $\alpha$ | 90.00 | $\beta$ | 0.00 | $\gamma$ | 0.00 |

Displacement and tilt(5)

| X | 0.00 | Y | 0.00 | Z | $-34.39$ |
|---|---|---|---|---|---|
| $\alpha$ | 90.00 | $\beta$ | 0.00 | $\gamma$ | 0.00 |

Displacement and tilt(6)

| X | 0.00 | Y | 0.00 | Z | $-11.57$ |
|---|---|---|---|---|---|
| $\alpha$ | 0.00 | $\beta$ | 0.00 | $\gamma$ | 0.00 |

Displacement and tilt(7)

| X | 0.00 | Y | 0.00 | Z | $-7.33$ |
|---|---|---|---|---|---|
| $\alpha$ | 0.00 | $\beta$ | 0.00 | $\gamma$ | 0.00 |

Displacement and tilt(8)

| X | 0.00 | Y | 0.00 | Z | $-3.83$ |
|---|---|---|---|---|---|
| $\alpha$ | 0.00 | $\beta$ | 0.00 | $\gamma$ | 0.00 |

Example 3

| Surface No. | Radius of curvature | Surface separation | Displacement and tilt | Refractive index | Abbe's No. |
|---|---|---|---|---|---|
| Object plane | ∞(Object Plane) | | (1) | | |
| 1 | ∞(Entrance Pupil) | | (2) | | |
| 2 | YRFS[1] | | (3) | 1.5163 | 64.1 |
| 3 | YRFS[2] (RE) | | (4) | 1.5163 | 64.1 |
| 4 | YRFS[3] (RE) | | (5) | 1.5163 | 64.1 |
| 5 | $-14.90$ | | (6) | | |
| 6 | ∞(Stop) | | (7) | | |
| 7 | IDL | | (8) | | |
| Image plane | ∞ | | | | |

YRFS[1]

| $C_1$ | $-2.0818 \times 10^{+1}$ | $C_2$ | $-1.0233$ | $C_3$ | $2.1440 \times 10^{-2}$ |
|---|---|---|---|---|---|

YRFS[2]

| $C_1$ | $2.8934 \times 10^{+1}$ | $C_2$ | $1.6091 \times 10^{-2}$ | $C_3$ | $-1.7026 \times 10^{-2}$ |
|---|---|---|---|---|---|
| $C_4$ | $1.5915 \times 10^{-4}$ | | | | |

YRFS[3]

| $C_1$ | $7.1506$ | $C_2$ | $1.9136$ | $C_3$ | $-4.7004 \times 10^{-2}$ |
|---|---|---|---|---|---|

Displacement and tilt(1)

| X | 0.00 | Y | $-\infty$ | Z | $-8.63$ |
|---|---|---|---|---|---|
| $\alpha$ | 90.00 | $\beta$ | 0.00 | $\gamma$ | 0.00 |

Displacement and tilt(2)

| X | 0.00 | Y | $-4.47$ | Z | $-8.63$ |
|---|---|---|---|---|---|
| $\alpha$ | 90.00 | $\beta$ | 0.00 | $\gamma$ | 0.00 |

Displacement and tilt(3)

| X | 0.00 | Y | 0.00 | Z | $-8.63$ |
|---|---|---|---|---|---|
| $\alpha$ | 90.00 | $\beta$ | 0.00 | $\gamma$ | 0.00 |

Displacement and tilt(4)

| X | 0.00 | Y | 0.00 | Z | $-24.37$ |
|---|---|---|---|---|---|
| $\alpha$ | 90.00 | $\beta$ | 0.00 | $\gamma$ | 0.00 |

-continued

| | | Displacement and tilt(5) | | | |
|---|---|---|---|---|---|
| X | 0.00 | Y | 0.00 | Z | −32.04 |
| α | 90.00 | β | 0.00 | γ | 0.00 |
| | | Displacement and tilt(6) | | | |
| X | 0.00 | Y | 0.00 | Z | −8.63 |
| α | 0.00 | β | 0.00 | γ | 0.00 |
| | | Displacement and tilt(7) | | | |
| X | 0.00 | Y | 0.00 | Z | −7.20 |
| α | 0.00 | β | 0.00 | γ | 0.00 |
| | | Displacement and tilt(8) | | | |
| X | 0.00 | Y | 0.00 | Z | −3.70 |
| α | 0.00 | β | 0.00 | γ | 0.00 |

Set out below are the angles (°) of incidence on the internal reflecting surfaces of the center light ray $2_0$ of the center light beam 2 coming from far way.

| Example | 1st Reflecting Surface | 2nd Reflecting surface |
|---|---|---|
| 1 | 4.690 | 30.280 |
| 2 | 20.728 | 25.135 |
| 3 | 18.477 | 43.011 |

With the panoramic attachment optical system of the invention described above, the image (entrance pupil) 5 of the stop 21 for the image-formation lens 20 in the Y-Z plane is formed at or near the entrance surface 11 in the panoramic attachment optical system 10, thereby reducing flare- or ghost-inducing unnecessary light entering the panoramic attachment optical system 10 primarily from a direction along the axis 1 of rotational symmetry and, hence, making it possible to view or pick up an image with reduced flares.

To this end, it is preferable to satisfy condition (1):

$$5 < |A/B| \qquad (1)$$

Here A is the optical path length between the entrance pupil position 5 and the stop 21 for the image-formation lens 20 (the product of distance×refractive index), and B is the optical path length between the object-side first surface 11 in the panoramic attachment optical system 10 and the entrance pupil position 5.

Condition (1) represents to what degree the entrance pupil 5 is near to the first surface 11 in the panoramic attachment optical system 10. In the invention, the entrance pupil 5 is located nearer to the first surface 11 in the optical system so that a flare stop for prevention of ghosts or the like can be more effectively located. It is also possible to make the first surface 11 smaller and increase the effective diameter of that surface, leading to more preferable correction of aberrations. It is further possible to use more reflecting surfaces and increase the angle of view in the Y-direction. As the lower limit of 5 to condition (1) is not reached, it causes the entrance pupil 5 to be too away from the first surface 11 in the optical system, resulting in an increase in the effective diameter of the first surface 11, the inability to increase the angle of view in the Y-direction, and more harmful flare light.

More preferably, $$10 < |A/B| \qquad (1\text{-}1)$$

The values of |A/B| in Examples 1, 2 and 3 are set out below.

| Example | |A/B| |
|---|---|
| 1 | 79.197 |
| 2 | 10.054 |
| 3 | 8.345 |

It is then preferable to satisfy condition (2):

$$0.2 < Fx/Fy < 2.0 \qquad (2)$$

Here Fx and Fy are the focal lengths of the whole panoramic attachment optical system 10 in the X- and Y-directions, respectively.

When there is a deviation from the lower limit of 0.2 and the upper limit of 2.0 to condition (2), the position with respect to the image-formation lens 20 of an object's virtual image transmitted from the panoramic attachment optical system 10 varies largely between in the sagittal direction and in the meridional direction, giving rise to astigmatism. This is not preferable, because correction of that aberration is little achievable by the rotationally symmetric image-formation lens 20, and offers a great deal of load.

The values of Fx/Fy in Examples 1, 2 and 3 are given below.

| Example | Fx/Fy |
|---|---|
| 1 | 0.9749 |
| 2 | 0.6590 |
| 3 | 0.4139 |

More preferably, a part of at least two internal reflecting surfaces should have positive power in the Y-direction, as in Example 2. A telephoto type wherein there is given a +− power profile in order from its object side will be an optical system unsuitable for wide-angle designs because of its increased focal length. Further, even at the same angle of view, it will be difficult to obtain an increased image height. Otherwise, the principal points of the panoramic attachment optical system 10 will be closer to the object side with respect to the image-formation lens 20, rendering the optical system bulky and, at the same time, offering a problem such as a failure in obtaining the desired performance due to overloads on a Y-direction pupil relay.

On the other hand, the power of each reflecting surface in the X-direction, because of being rotationally symmetric with respect to the Y-axis, is determined on where it is located, resulting in a decrease in the degree of flexibility. To this end, the power profile in the Y-direction becomes important.

Tabulated below are the powers in the X- and Y-directions of the first transmitting surface and the reflecting surfaces in Examples 1, 2 and 3.

| | Ex. 1 | Ex. 2 | Ex. 3 |
|---|---|---|---|
| Y-Power | | | |
| 1st Transmitting Surface | −0.098 | 0.039 | 0.032 |
| 1st Reflecting Surface | 0.057 | 0.249 | 0.103 |
| 2nd Reflecting surface | −0.106 | 119.929 | −0.616 |

-continued

|  | Ex. 1 | Ex. 2 | Ex. 3 |
|---|---|---|---|
| X-Power |  |  |  |
| 1st Transmitting Surface | 0.019 | 0.018 | 0.017 |
| 1st Reflecting Surface | 0.125 | 0.121 | 0.105 |
| 2nd Reflecting surface | 0.104 | −0.040 | −0.196 |

The panoramic attachment optical system 10 such as those of Examples 1–3 could be integrally combined with the image-formation lens 10 into a panoramic optical system according to the invention.

The panoramic optical system could be constructed in a form of small size with reduced flare light, as exemplified in the following examples.

Figure 7:
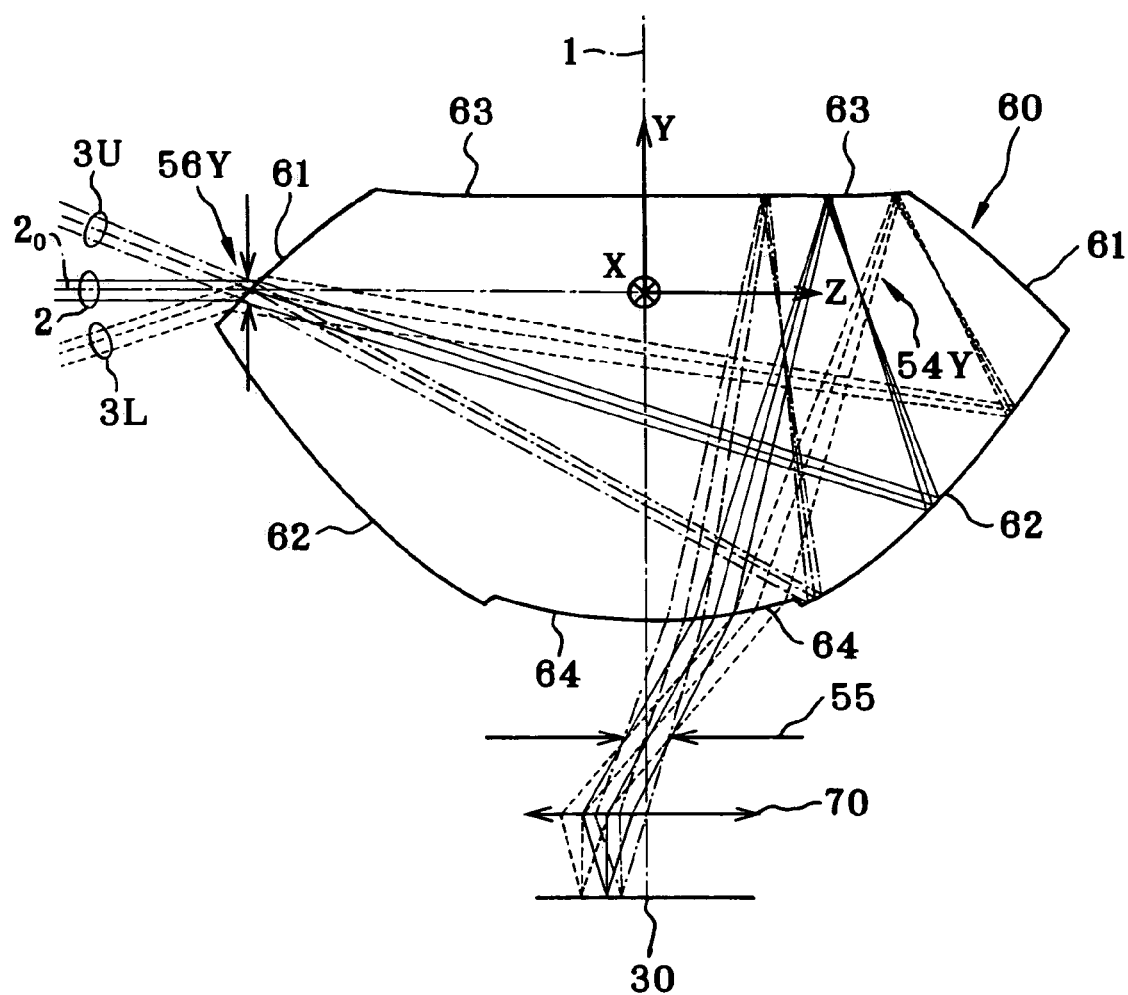
FIG. 7 is a sectional view of the panoramic optical system of Example 4 according to the invention, as taken along its center axis.
Figure 8A:
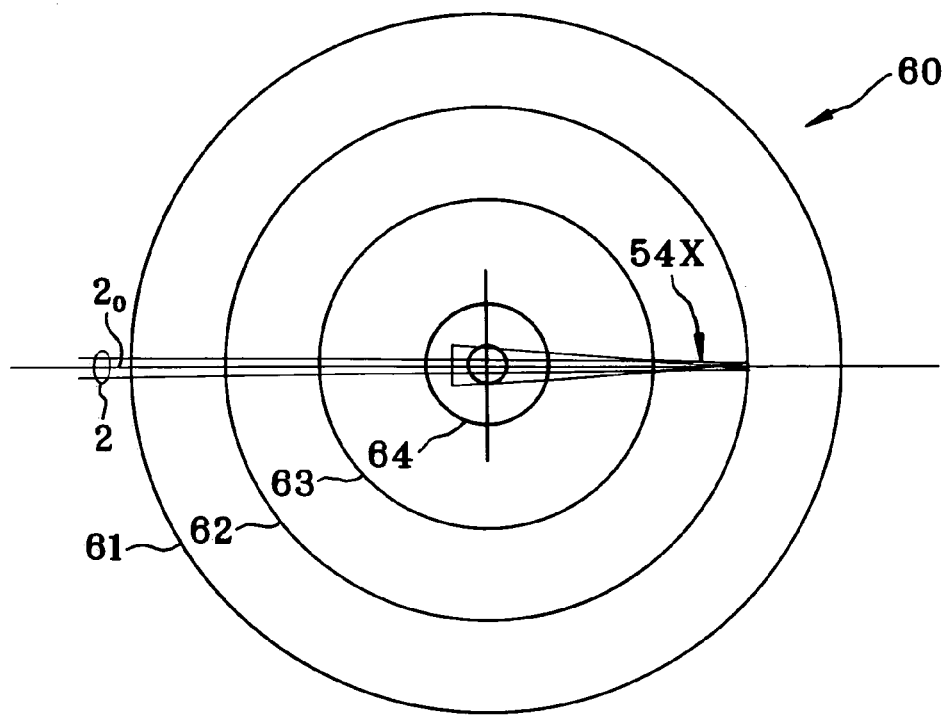
FIG. 8 is a plan view of an optical path through the optical system of Example 4 according to the invention.

FIG. 7 is illustrative in section of the panoramic optical system of Example 4 described later, as taken along its center axis (axis of rotational symmetry) 1, and FIG. 8 is a plan view of an optical path through that optical system. Specifically, FIG. 8(*a*) is illustrative of an optical path at an azimuth angle of 0°, and FIG. 8(*b*) is illustrative of optical paths at azimuth angles of 0° and ±10°. The panoramic optical system of the invention is now explained with reference to FIGS. 7 and 8. While that optical system will be described in the form of an image-formation optical system, it is to be understood that if the optical path is reversed, it will be used as a projection optical system for projecting an image in a full 360°-(full-panoramic) direction.

This panoramic optical system is made up of a front unit 60 rotationally symmetric about the center axis 1, and a rear unit 70 rotationally symmetric about the center axis 1. A light beam 2 coming from a distant object passes-through the front unit 60 and the rear unit 70 in this order, forming an image at a position of an image plane 30 that is vertical to and off the center axis 1.

The front unit 60 is formed of a resin or other transparent medium that is rotationally symmetric about the center axis 1 and has a refractive index greater than 1, and includes two internal reflecting surfaces 62, 63 and two transmitting surfaces 61, 64. The internal reflecting surfaces 62, 63 and the transmitting surfaces 61, 65 are each of shape rotationally symmetric about the center axis 1. The rear unit 70 is comprised of a co-axial refracting optical system such as a lens system that is rotationally symmetric about the center axis 1 and has positive power. In Example 4, the rear unit 70 is comprised of an ideal lens or an aberration-free lens system.

The transparent medium of the front unit 60 includes, a first transmitting surface 61 on which a light beam 2 coming from far away is incident, a reflecting surface 62 that is positioned oppositely to the first transmitting surface 61 with the center axis 1 interposed between them and receives a light beam leaving the first transmitting surface 61, a second reflecting surface 63 that is positioned on the same side as the first reflecting surface 62 and receives a light beam reflected at the first reflecting surface 62, and a second transmitting surface 64 that faces the rear unit 70 and receives a light beam reflected at the second reflecting surface 63, wherein the center of the first reflecting surface 62 (the position on which the center light ray $2_0$ of the center light beam 2 is to be incident) is positioned nearer to the rear unit 70 side than the center of the second reflecting surface 63 (the position on which the center light ray $2_0$ of the center beam 2 is to be incident), as viewed in the center axis 1 direction.

In the example of FIG. 7, between the front unit 60 and the rear unit 70 a stop-forming circular aperture 55 is positioned coaxially to the center axis 1.

When the center axis 1 lies in the vertical direction, the center light beam 2 coming from far away in the horizontal direction enters the transparent medium of the front unit 60 after refraction through the entrance-side first transmitting surface 61, goes across the center axis 1, and enters the first reflecting surface 62 opposite to the first transmitting surface 61. The light reflected at the first reflecting surface 62 away from the rear unit 70 enters the second reflecting surface 63 where it is reflected toward the rear unit 70. The reflected light beam is refracted through the second transmitting surface 64, and then leaves the transparent medium of the front unit 60, entering the rear unit 70 via an aperture 55 to form an image at a radially given position of an image plane 30, which is off the center axis 1.

Here, the front unit 60 plays a role of receiving a light beam coming from images in every direction-toward the axis 1 of rotational symmetry to convert it into a circular ring form of aerial image at any position, and the rear unit 70 takes a role of projecting that circular ring form of aerial image onto the image plane 30.

According to the panoramic optical system of the invention, in a section including the center axis 1 (FIG. 7), an intermediate image is formed one time at a position 54Y between the first reflecting surface 62 and the second reflecting surface 63. In a plane (FIG. 8) that is orthogonal to the plane including the center axis and includes the center light ray of that light beam, too, an intermediate image is formed one time at a position 54X between the first reflecting surface 62 and the second reflecting surface 63.

To prevent harmful flare light incident from above in FIG. 7 from entering the panoramic optical system of the invention through the first transmitting surface 61, that panoramic optical system is designed such that only in the plane including the center axis 1, an entrance pupil 56Y is formed at or near the first transmitting surface 61, thereby cutting off such flare light. The stop (aperture) 55 located on the center axis 1 forms an entrance pupil 56Y upon back projection by the front unit 60. Location of this entrance pupil 56Y at or near the first transmitting surface 61 in the section including the center axis 1 means that a flare stop is located at or near the back-projected entrance pupil 56Y, enabling unnecessary light entering the front unit 60 to be largely cut off and flares to be much more reduced.

For the flare stop, it is desired to locate a zonal slit rotationally symmetric about the center axis 1 at or near, and especially just before, the first transmitting surface 671. The flare stop located right before the first transmitting surface 61 could be in a casing form for protection of the optical system or, alternatively, in a transparent pipe form that is painted black at a portion that is not transparent to light rays. The image plane-side (lower-side) flare stop could also be replaced by a reflection coating portion of the first reflecting surface 62. On the opposite (upper) side of the transparent medium of the front unit 60 to the image plane 30, there is the effective area of the second reflecting surface 63 plus a large unavailable area. If that large unavailable area other than the effective surface (the second reflecting surface 63) is grained and coated with a black coating material, it could then be used as a replacement for the flare stop. It is noted that instead of the aperture 55, the zonal slit as the flare stop located at or near the first transmitting surface 61 could be used as an aperture stop that forms the entrance pupil 56Y by itself.

Figure 8B:
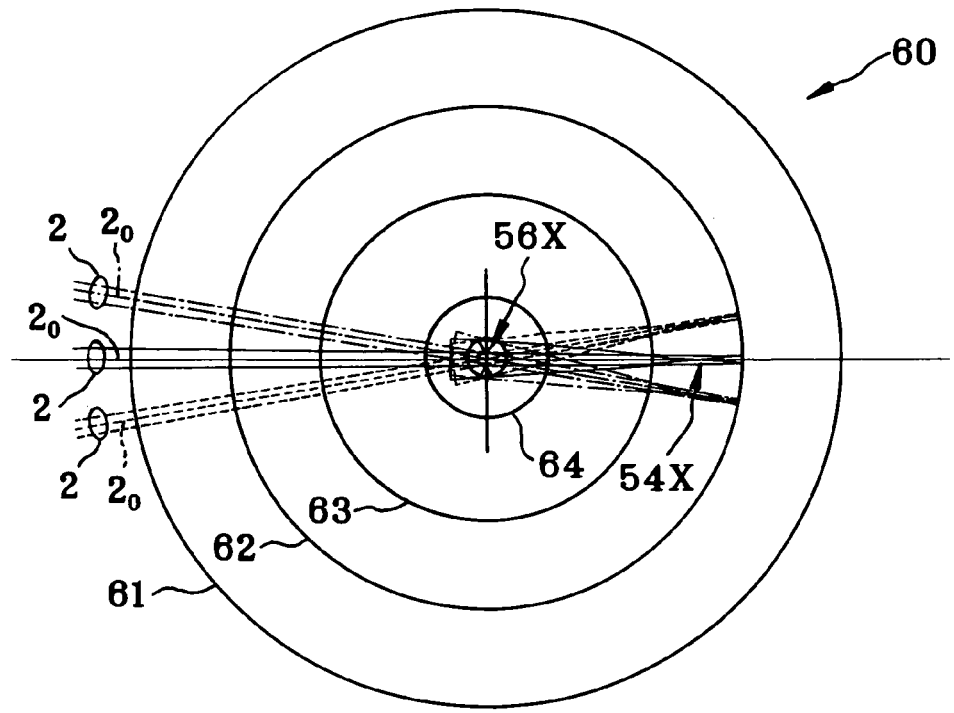

Since the optical system of the invention is rotationally symmetric about the center axis 1, as shown in FIG. 8(b), on the other hand, all light beams 2 coming from far away in different directions pass constantly on the center axis 1 (the center of rotation) in the direction orthogonal to the center axis 1. In other words, all light beams arriving at the circular ring form of entrance surface 61 in the transparent medium of the front unit 60 in the direction orthogonal to the center axis 1 will reach the image plane 30 after passing through the center axis 1 and, hence, the entrance pupil 56X formed by back projection of the stop 55 in the direction orthogonal to the center axis 1 will be found on the center axis 1.

Thus, there is a difference in the position of the entrance pupils 56Y, 56X between in the plane including the center axis 1 and in the plane that is orthogonal to the plane including the center axis 1 and includes the center light ray $2_0$ of the light beam 2. For the invention, therefore, the front unit 60 must have a different focal length between in the plane (Y-Z direction) including the center axis 1 and in the plane (X-Z direction) orthogonal to the center axis 1.

The X-Z direction focal length $F_{fx}$ and the Y-Z direction focal length $F_{fy}$ of the front unit 60 are determined from tilts of light rays upon leaving the front unit 60, as light rays taking apart with minuscule distances at any angles of view are traced in the plane (Y-Z direction) including the center axis 1 and the plane (X-Z direction) orthogonal to the center axis 1 of the front unit 60.

To locate the entrance pupil 56Y at or near the first transmitting surface 61 in the plane including the center axis 1, it is preferable to satisfy the following condition (3):

$$F_{fx}/F_{fy} < 0.95 \tag{3}$$

As the upper limit of 0.95 to condition (3) is exceeded, the X-Z direction focal length is almost equal to the Y-Z direction focal length; that is, it is impossible to make the back projection position of the stop 55 significantly different between the X-Z direction and the Y-Z direction. This in turn causes the entrance-pupil 56Y to be closer to the center axis 1, ending up with an increase in the Y-Z direction diameter of the first transmitting surface 61 and much more flare light.

More preferably, $$F_{fx}/F_{fy} < 0.9 \tag{3-1}$$

Likewise, for the ratio of the whole optical system between the X-Z direction focal length $F_x$ and Y-Z direction focal length $F_y$, viz., the Fx/Fy ratio, it is important to satisfy the following condition (4):

$$F_x/F_y < 0.95 \tag{4}$$

More preferably, $$F_x/F_y < 0.9 \tag{4-1}$$

For the focal length $F_b$ of the rear unit 70, it is preferable to satisfy the following conditions (5) and (6):

$$0.7 < F_{fx}/F_b < 20 \tag{5}$$

$$0.7 < F_{fy}/F_b < 20 \tag{6}$$

Condition (5) defines the ratio of the focal length $F_{fx}$, $F_{fy}$ of the rear unit 60 to the focal length $F_b$ of the rear unit 70, and the focal lengths of the front unit 60 and the rear unit 70 being well balanced is a requirement for making a reasonable tradeoff between balanced correction of aberrations in the associated directions and whole size reductions.

As the lower limit of 0.7 to both conditions (5) and (6) is not reached, it causes the focal length of the rear unit 70 to become too long, rendering the whole optical system bulky. As the upper limit of 20 to both the conditions is exceeded, it causes the focal length of the rear unit 70 to become too short, and the angle of view demanded for the rear unit 70 to become too wide with the result that the resolving power of the rear unit 70 for a peripheral image portion goes worse due to field curvature, astigmatism, chromatic aberration of magnification, etc. Thus, the resolution of a peripheral portion of a circular ring form of image on the image plane 30 becomes worse throughout the optical system.

More importantly, both conditions (5) and (6) should be satisfied at the same time.

Even more preferably, $$1 < F_{fx}/F_b < 10 \tag{5-1}$$

$$1 < F_{fy}/F_b < 10 \tag{6-1}$$

As described above, the invention has a feature of the entrance pupil 56Y in the Y-Z section (the section including the center axis 1) lying at or near the first transmitting surface 61, and that feature enables the flare stop for prevention of flares or the like to be effectively positioned. This in turn makes the entrance surface of the optical system smaller in the Y-Z section, and ensures more effective prevention of unnecessary light from entering the front unit 60, working out a radical flare preventive measure. To this end, it is important to satisfy the following condition (7).

In the Y-Z section, now let A indicate an optical path length from the position of the entrance pupil 56Y to the position of the stop 55, B stand for an optical path length from the position of the entrance pupil 56Y to the first transmitting surface 61 in the front unit 60 on condition that the direction of light rays is positive, and |A/B| be representative of the optical path length ratio. |A/B| implies to what degree the entrance pupil 56Y is near to the entrance surface 61 in the front unit 60.

$$5 < |A/B| \tag{7}$$

As the lower limit of 5 to condition (7) is not reached, it causes the entrance pupil 56Y in the section including the center axis 1 to be away from the first surface 61 of the optical system, resulting in an increase in the effective diameter of the first surface 61 and the inability to effectively cut off harmful flare light entering the front unit 60. The larger this value, the more effectively the flare-preventive flare stop acts.

More preferably, $$20 < |A/B| \tag{7-1}$$

Here let C stand for a distance of the entrance pupil 56Y from the center axis 1, and D indicate a distance of the flare stop from the center axis 1. Then, it is preferable to satisfy the following condition (8):

$$0.1 < C/D < 10 \tag{8}$$

Condition (8) defines where to locate the flare stop. The closer to 1 it is, the nearer the position of the entrance pupil 56Y is to the position of the flare stop in the Y-Z section and, hence, the more effective the flare stop becomes.

The flare stop located in the panoramic optical system of the invention could be a mechanical one, or it could be replaced by the effective diameter of the reflective coating on the first reflecting surface 62 or the second reflecting surface 63 in the front unit 60 or a non-optical surface that is grained and painted with a black coating material.

Set out below are the value of the parameters regarding conditions (3) to (8) in Examples 4 to 6, given later, on the assumption that the flare stop is located at a position of a distance D at or near the first transmitting surface 61. C/D=1 means that the flare stop lies on the first transmitting surface 61.

|   | Ex. 4 | Ex. 5 | Ex. 6 |
|---|---|---|---|
| $F_x$ | −1.855 | −1.953 | −1.754 |
| $F_y$ | −2.581 | −2.782 | −1.903 |
| $F_x/F_y$ | 0.719 | 0.702 | 0.922 |
| $F_{fx}$ | 15.385 | 8.726 | 15.175 |
| $F_{fy}$ | 18.215 | 15.175 | 15.480 |
| $F_{fx}/F_{fy}$ | 0.845 | 0.575 | 0.980 |
| $F_b$ | 3.500 | 5.126 | 3.500 |
| $F_{fx}/F_b$ | 4.396 | 1.702 | 4.336 |
| $F_{fy}/F_b$ | 5.204 | 2.960 | 4.423 |
| A | 112.464 | 111.758 | 149.990 |
| B | −0.055 | −0.001 | 0.039 |
| \|A/B\| | 2235.863 | 202093.309 | 3833.311 |
| C | 18.333 | 17.203 | 20.990 |
| D | 19.000 | 18.000 | 21.000 |
| C/D | 0.965 | 0.956 | 1.000 |

The panoramic optical system of the invention is now explained more specifically with reference to Examples 4, 5 and 6. Although will be enumerated later, the constructional parameters in these examples have been determined on the results of normal ray tracing from an object plane to an image plane 30 via a front unit 60 and a rear unit 70, as shown typically in FIG. 7.

For a coordinate system, assume that, in normal ray tracing as shown typically in FIG. 7, the origin of a decentered optical surface in a decentered optical system is defined by a position of projection of an entrance pupil 56Y onto the rotationally symmetric axis (center axis) 1, the Y-axis positive direction by a direction from the rotationally symmetric axis (center axis) 1 away from the image plane 30, and the Y-Z plane is defined by the paper plane of FIG. 7. Further, the Z-axis positive direction is defined by a direction opposite to the entrance pupil 56Y now assumed to lie in the paper plane of FIG. 7, and the X-axis positive direction by an axis that forms with the Y- and Z-axes a right-handed orthogonal coordinate system.

For a decentered surface are the amount of decentration of that surface from the center of the origin of the aforesaid optical system on a coordinate system on which that surface is defined (X, Y and Z are indicative of the X-axis direction, the Y-axis direction, and the Z-axis direction, respectively), and the angles of tilt ($\alpha$, $\beta$, $\gamma$ (°)) of the coordinate systems for defining the surfaces with the centers on the X-, Y- and Z-axes, respectively. In that case, the positive for $\alpha$ and $\beta$ mean counterclockwise rotation with respect to the positive directions of the respective axes, and the positive for $\gamma$ means clockwise rotation with respect to the positive direction of the Z-axis. Referring here to how to perform $\alpha$-, $\beta$- and $\gamma$-rotations of the center axis of the surface, the coordinate system that defines each surface is first $\alpha$-rotated counterclockwise about the X-axis of the coordinate system that is defined at the origin of the optical system. Then, the coordinate system is $\beta$-rotated counterclockwise about the Y-axis of the rotated new coordinate system. Finally, the coordinate system is $\gamma$-rotated clockwise about the Z-axis of the rotated new another coordinate system.

When, of optical surfaces forming the optical system of each example, a specific surface and the subsequent surface form together a co-axial optical system, there is given a surface spacing. Besides, the radius of curvature of each surface and the refractive index and Abbe constant of the medium are given as usual.

It is noted that the term with respect to aspheric surfaces on which no data are mentioned in the constructional parameters, given later, is zero. Refractive indices and Abbe constants are given on a d-line (587.56 nm wavelength) basis, and length in mm. The decentration of each surface is given in terms of the amount of decentration from the position of projection of the entrance pupil 56Y onto the axis 1 of rotational symmetry (center axis).

It is noted that the aspheric surface is a rotationally symmetric aspheric surface given by the following defining formula.

$$Z=(Y^2/R)/[1+\{1-(1+k)Y^2/R^2\}^{1/2}]+aY^4+bY^6+cY^8+ dY^{10}+\ldots \quad (a)$$

where Z is the optical axis (axial chief ray) with the proviso that the direction of travel of light is positive and Y is taken in a direction vertical to the optical axis, R is a paraxial radius of curvature, K is a conical constant, and a, b, c, d, . . . are the fourth-, the sixth-, the eighth-, the tenth-order aspheric coefficients. The Z-axis in this defining formula becomes the axis of the rotationally symmetric aspheric surface.

In this conjunction, an extended rotation free-form surface is a rotationally symmetric surface given by the following definition.

First, the following curve (b) passing through the origin on the Y-Z coordinate plane is determined.

$$Z=(Y^2/RY)/[1+\{1-(C_1+1)Y^2/RY^2\}^{1/2}]C_2Y+C_3Y^2+ C_4Y^3+C_5Y^4+C_6Y^5+C_7Y^6+\ldots+C_{21}Y^{20}+\ldots C_{n+1}Y^n \quad (b)$$

Then, a curve F(Y) is determined by rotation through an angle $\theta$ (°) of that curve (b) in the X-axis position direction provided that the counterclockwise direction is taken as positive. This curve F(Y), too, passes through the origin on the Y-Z coordinate plane.

The extended rotation free-form surface is defined by a rotationally symmetric surface obtained by parallel translation of that curve F(Y) by a distance R in the Z-positive direction (in the Z-negative direction when R is negative), and then rotation of the parallel translated curve about the Y-axis.

As a result, the extended rotation free-form surface becomes a free-form surface (free-form curve) in the Y-Z plane, and a circle with a radius |R| in the X-Z plane.

From this definition, the Y-axis becomes the axis of the extended rotation free-form surface.

Here, RY is the radius of curvature of the spherical term in the Y-Z section, $C_1$ is a conical constant, and $C_2$, $C_3$, $C_4$, $C_5$, etc. are the aspheric coefficients of first, second, third, and fourth order, respectively.

In the panoramic optical system of the invention, it is preferable that at least one of the internal-reflecting surfaces 62, 63 and the transmitting surfaces 61, 64 in the front unit 60 is composed of such an extended rotation free-form surface, and when expressed by a polynomial in the Y-Z section, it is of rotationally symmetric shape formed by rotation about the center axis 1 of a line segment of any shape having at least an odd-number order term with no symmetric plane. By allowing at least one internal reflecting surface or transmitting surface to have such a surface shape, it is possible to provide an optical system of improved resolving power, wherein decentration aberrations unavoidably associated with a reflecting optical system are corrected, and to reduce the size of that optical system.

EXAMPLE 4

FIG. 7 is a sectional view of the panoramic optical system of Example 4, as taken along a center axis 1 (axis of rotational symmetry), and FIG. 8 is a plan view of an optical path through that optical system.

This panoramic optical system of this example is made up of a front unit 60 rotationally symmetric about the center axis 1, and a rear unit 70 rotationally symmetric about the center axis 1. A light beam 2 coming from a distant object passes through the front unit 60 and the rear unit 70 in this order, forming an image at a position of an image plane 30 that is vertical to and off the center axis 1. When the center axis is set vertically, there is formed on the image plane 30 a circular ring form of image having a full-360° (full-panoramic) angle of view whose zenithal direction lies in the center direction of the image and whose horizon lies outside.

The front unit 60 is formed of a resin or other transparent medium that is rotationally symmetric about the center axis 1 and has a refractive index greater than 1, and includes two internal reflecting surfaces 62, 63 and two transmitting surfaces 61, 64. The internal reflecting surfaces 62, 63 and the transmitting surfaces 61, 64 are each of shape rotationally symmetric about the center axis 1. The rear unit 70 is comprised of an ideal lens or an aberration-free lens system that is rotationally symmetric about the center axis 1 and has positive power.

The transparent medium of the front unit 60 includes a first transmitting surface 61 on which a light beam 2 coming from far away is incident, a first reflecting surface 62 that is positioned oppositely to the first transmitting surface 61 with the center axis 1 interposed between them and receives a light beam leaving the first transmitting surface 61, a second reflecting surface 63 that is positioned on the same side as the first reflecting surface 62 and receives a light beam reflected at the first reflecting surface 62, and a second transmitting surface 64 that faces the rear unit 70 and receives a light beam reflected at the second reflecting surface 63, each composed of an extended rotation free-form surface with both a conical constant and an aspheric coefficient being zero.

Between the front unit 60 and the rear unit 70 a stop-forming circular aperture 55 is positioned coaxially to the center axis 1.

When the center axis 1 lies in the vertical direction and the optical system directs to the zenith, the center light beam 2 coming from far away in the horizontal direction enters the transparent medium of the front unit 60 after refraction through the entrance-side first transmitting surface 61, goes across the center axis 1, and enters the internal reflecting surface 62 opposite to the transmitting surface 61. The light reflects upwardly at the internal reflecting surface 62 away from the rear unit 70, and enters the internal reflecting surface 63 positioned on the same side as the internal reflecting surface 62 and more away from the rear unit 70, where it is again reflected toward the rear unit 70. The reflected light beam leaves the transparent medium of the front unit 60 via the exit-side transmitting surface 64, entering the rear unit 70 via an aperture 55 to form an image at a radially given position of an image plane 30, which is off the center axis 1.

In the panoramic optical system of this example, light beams 2, 3U and 3L coming from far away (the light beam 3U comes from a distance point in the sky, and 3L comes from a distant point on the ground) form an intermediate image one time at a position 54Y between the first reflecting surface 62 and the second reflecting surface 63 in a section including the center axis 1 (FIG. 7), and they form an intermediate image one time at a position 54X between the first reflecting surface 62 and the second reflecting surface 63 as well in a plane (FIG. 8) that is orthogonal to a plane including the center axis 1 and includes a center light ray of the light beam.

In this example, the whole optical path length is short because the second reflecting surface 63 is located oppositely to the transmitting entrance surface 61 (on the same side as the first reflecting surface 62) with the center axis 1 interposed between them, but yet light rays reflected at the first reflecting surface 62 and the second reflecting surface 63 can have substantially the same angle of 45° or smaller so that the occurrence of decentration aberrations in particular can be minimized.

In the panoramic optical system of this example, there is the effective second reflecting surface 63 on the zenithal side of the transparent medium plus a large unavailable area. If the large unavailable area other than the effective surface (the second reflecting surface 63) is grained and coated with a black coating material, it is then possible to shade off unnecessary light that is incident from the zenithal side along the axis 1 of rotational symmetry to form flares or ghosts and, hence, observe (pick up) an image with much more reduced flares.

The specifications of Example 4 are:
Focal length of the ideal lens 70: 3.5 mm,
Horizontal angle of view: 360°,
Vertical angle of view: 40°,
Entrance pupil diameter: 1.3 mm, and
Image size: $\phi 5.98$ to $\phi 2.20$ mm.

Figure 9:
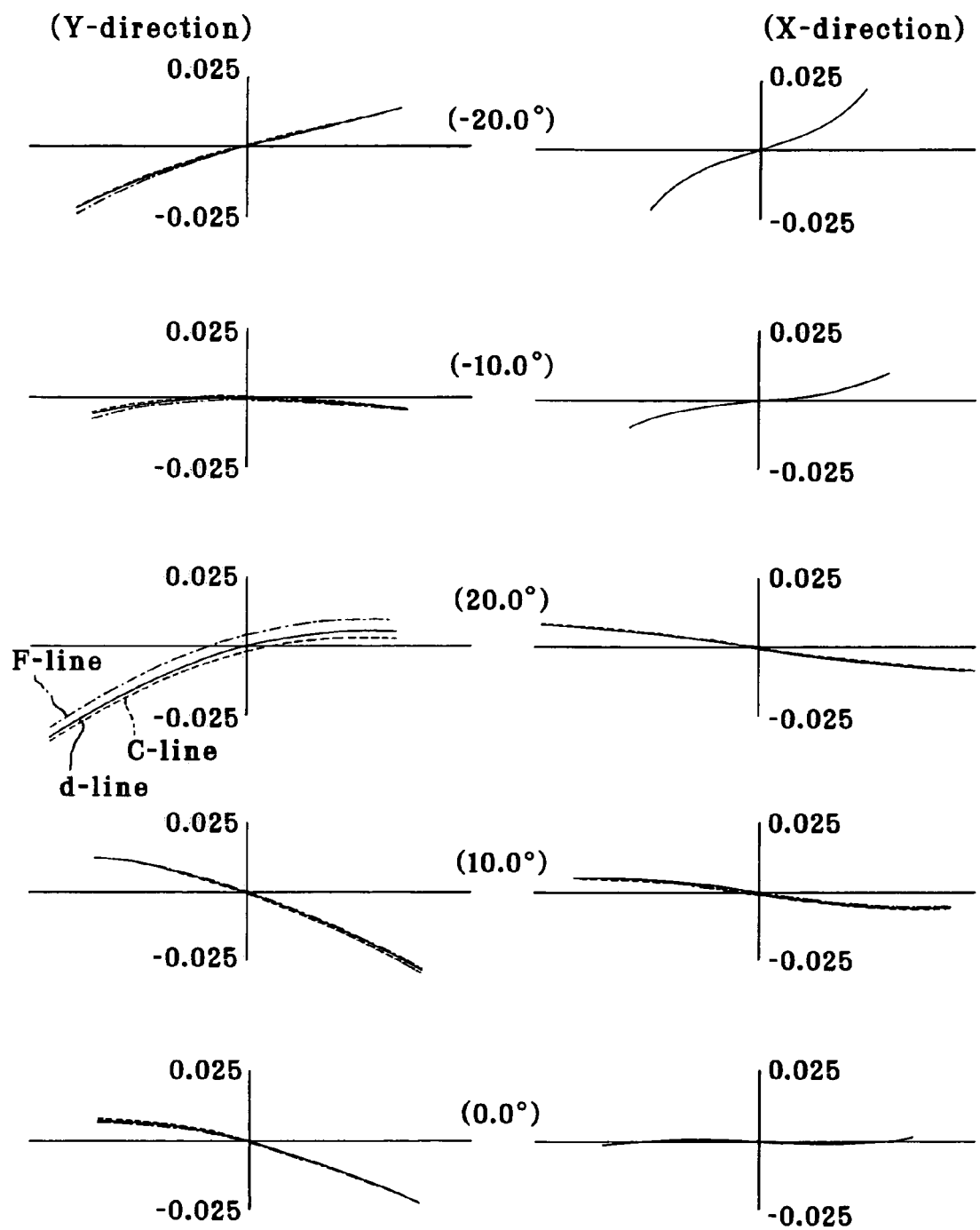
FIG. 9 is a transverse aberration diagram for the whole optical system of Example 4.

FIG. 9 is illustrative of the transverse aberrations for the whole optical system of this example, wherein the bracketed angles at the center stand for vertical angles of view and Y-direction (meridional) and X-direction (sagittal) transverse aberrations at those angles are shown. The same shall apply hereinafter.

Figure 10:
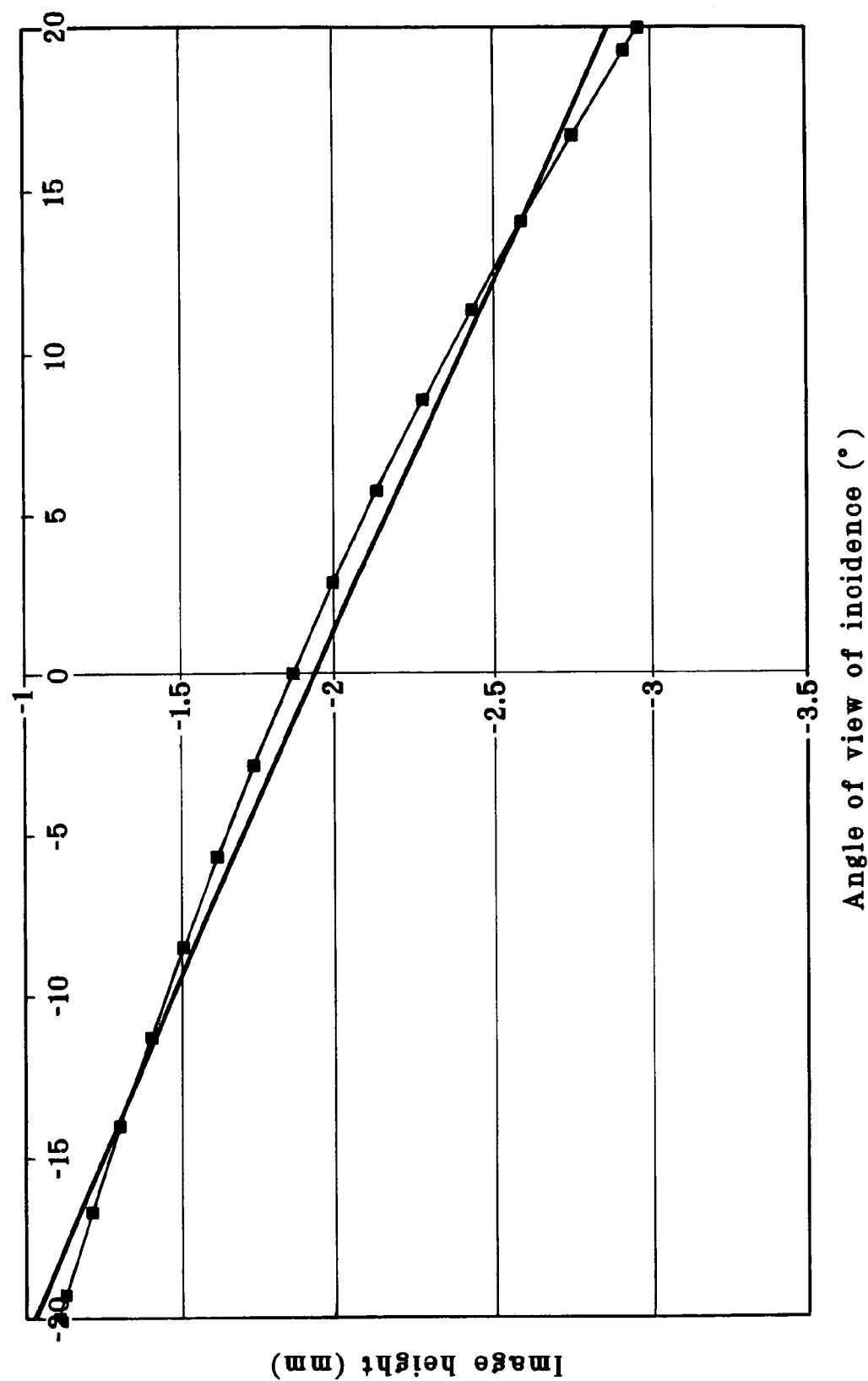
FIG. 10 is indicative of distortion of Example 4 in the vertical direction.

FIG. 10 is a graph of vertical distortion in this example, wherein a curve running through ■ is obtained by plotting image heights at the image plane 30 (radial image heights from the center axis 1) against the vertical view angle of incidence of the optical system of Example 4, and a thick solid line is representative of image heights proportional to the view angle of incidence (IH ∝ f·θ where IH is an image height, f is a focal length and θ is an angle of view).

EXAMPLE 5

Figure 11:
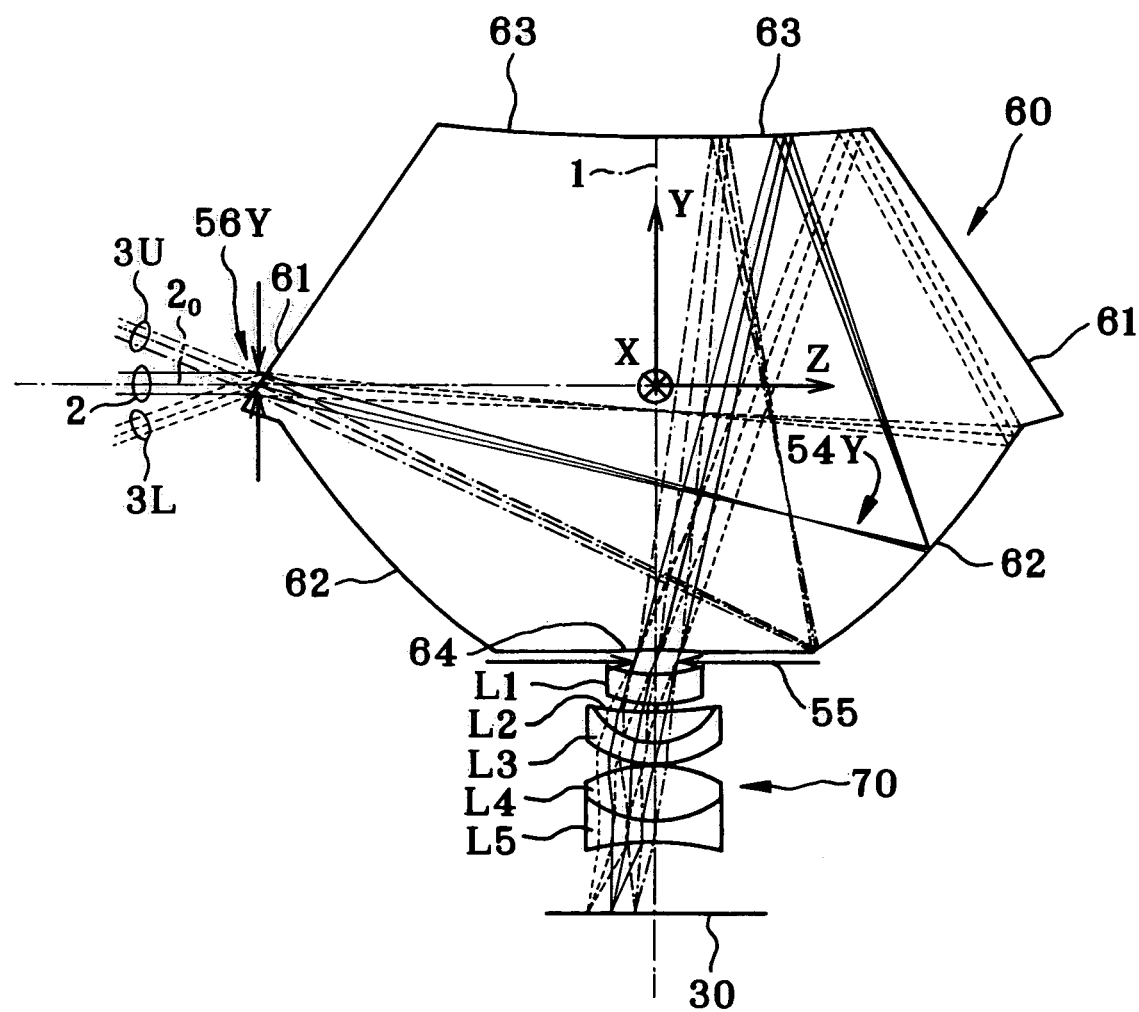
FIG. 11 is a sectional view of the panoramic optical system of Example 5 of the invention, as taken along its center axis.
Figure 12A:
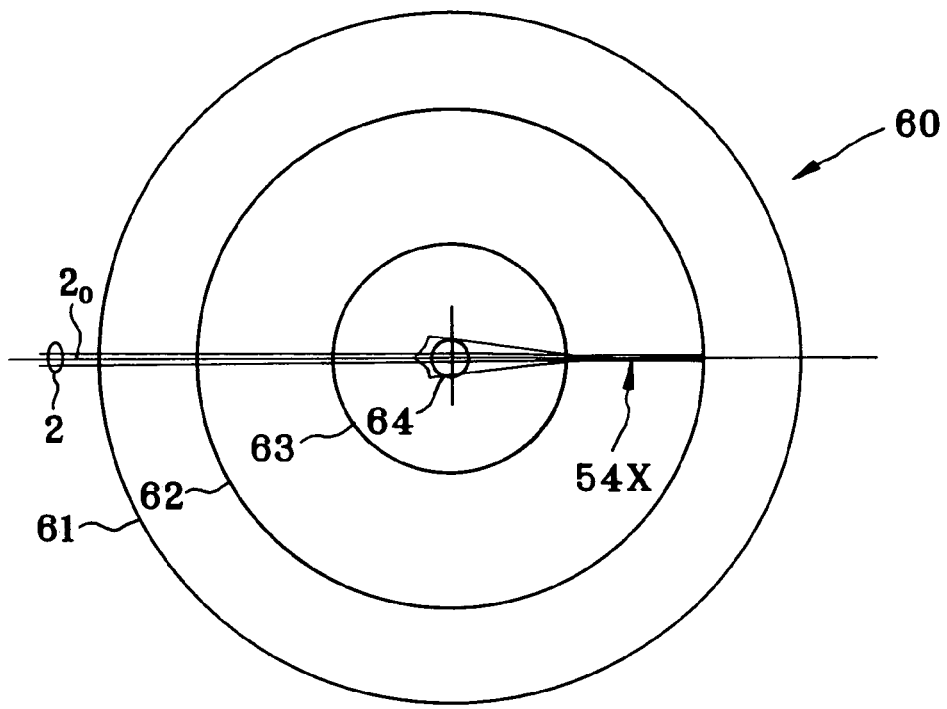
FIG. 12 is a plan view of an optical path through the optical system of Example 5 of the invention.
Figure 12B:
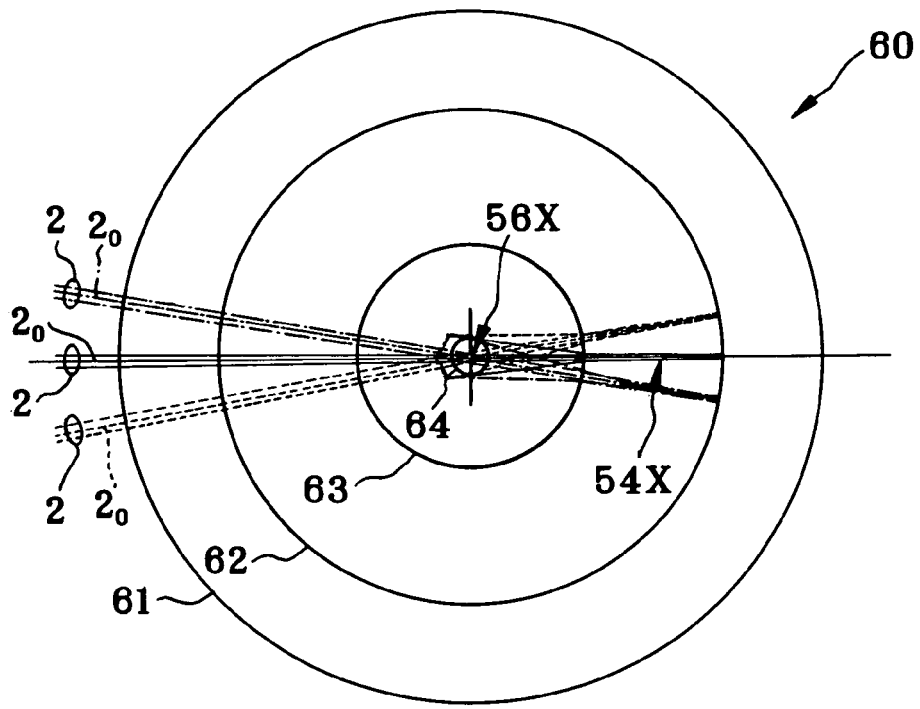
Figure 13:
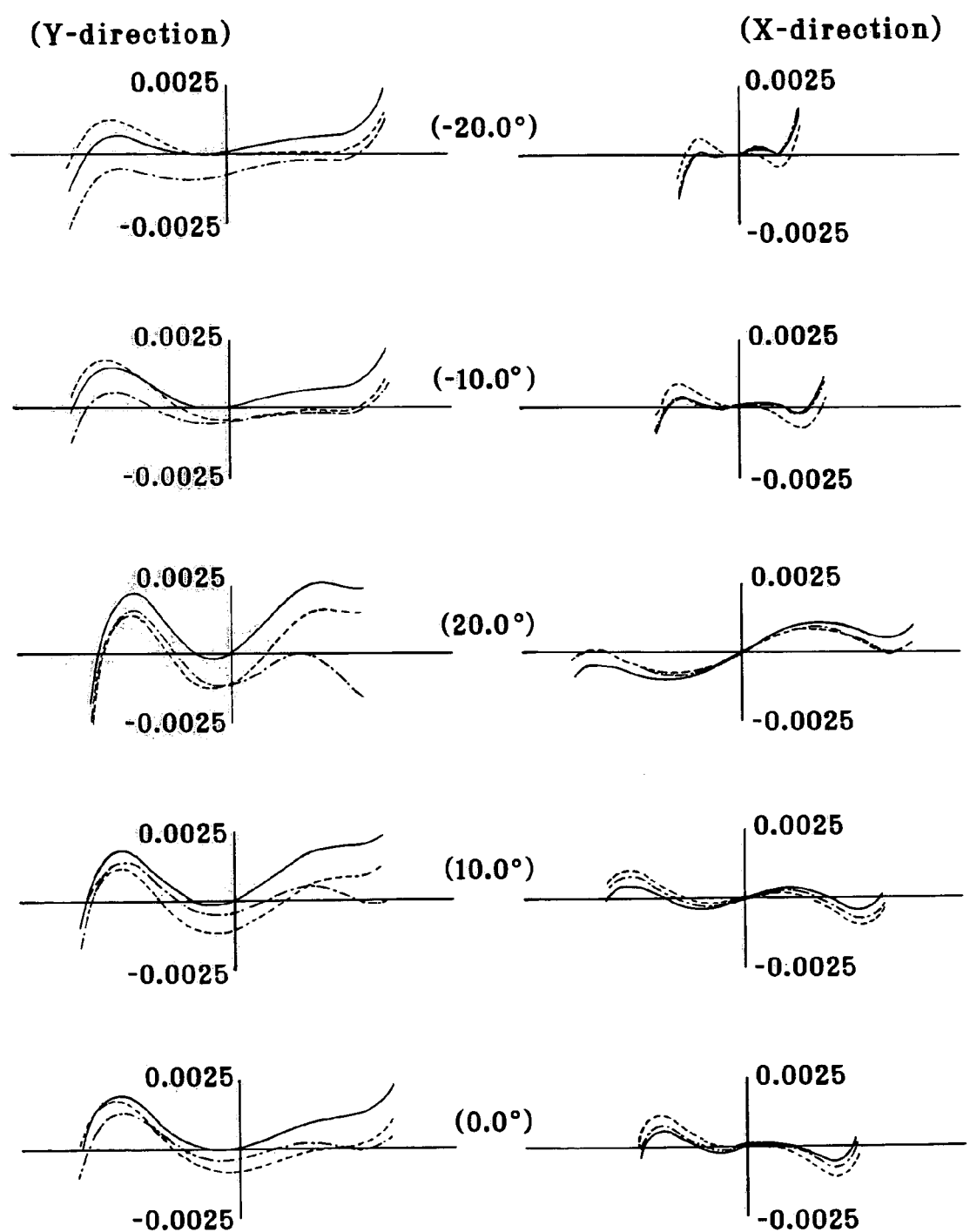
FIG. 13 is a transverse aberration diagram for the whole optical system of Example 5.

FIG. 11 is a sectional view, similar to FIG. 7, of the panoramic optical system of Example 5, as taken along a center axis 1 (axis of rotational symmetry), and FIG. 12 is a plan view, similar to FIG. 8, of an optical path through that optical system. FIG. 13 is a transverse aberration diagram, similar to FIG. 9, for this example.

The panoramic optical system of this example is similar in construction to Example 4 with the exception that the rear unit 70 is composed of a three-group lens system including five lenses L1 to L5 in place of the ideal lens and the second transmitting surface 64 in the transparent medium of the front unit 60 is composed of an aspheric surface rotationally symmetric about the center axis 1 in place of the extended rotation free-form surface. The lens system forming the rear unit 70 is composed of, in order from the front unit 60, a positive meniscus lens L1 concave on the front unit 60 side, a doublet consisting of a positive meniscus lens L2 concave on the front unit 60 side and a negative meniscus lens L3 concave on the front unit 60 and a doublet consisting of a double-convex positive lens L4 and a double-concave negative lens L5.

Example 5 works as in Example 4. In this example, however, an intermediate image-formation position 54Y in the section including the center axis 1 is at or near the first reflecting surface 62 between the first transmitting surface 61 and the first reflecting surface 62.

The specifications of Example 5 are:
Focal length of the ideal lens 70: 5.12 mm,
Horizontal angle of view: 360°,
Vertical angle of view: 40°,
Entrance pupil diameter: 1.2 mm,.and
Image size: ϕ5.97 to ϕ2.01 mm.

Figure 14:
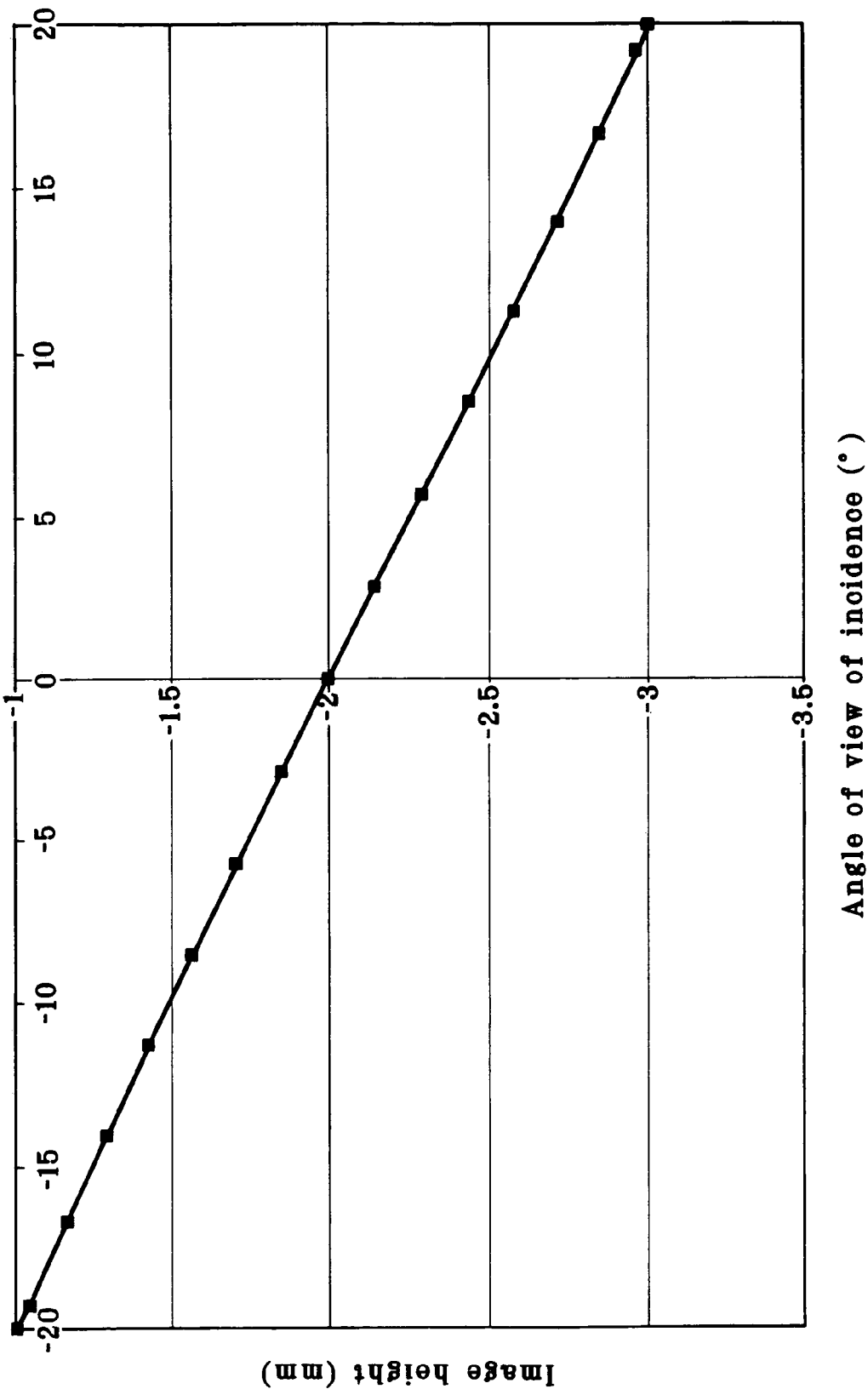
FIG. 14 is indicative of distortion of Example 5 in the vertical direction.

FIG. 14 is illustrative of vertical distortion in this example, wherein a curve running through ■ and a solid line have the same meanings as in FIG. 10. The instant example is much more improved in terms of vertical distortion because of having a narrow vertical angle of view (40°) and because the odd-number order term ($C_4$) is used for the reflecting surfaces 62, 63.

EXAMPLE 6

Figure 15:
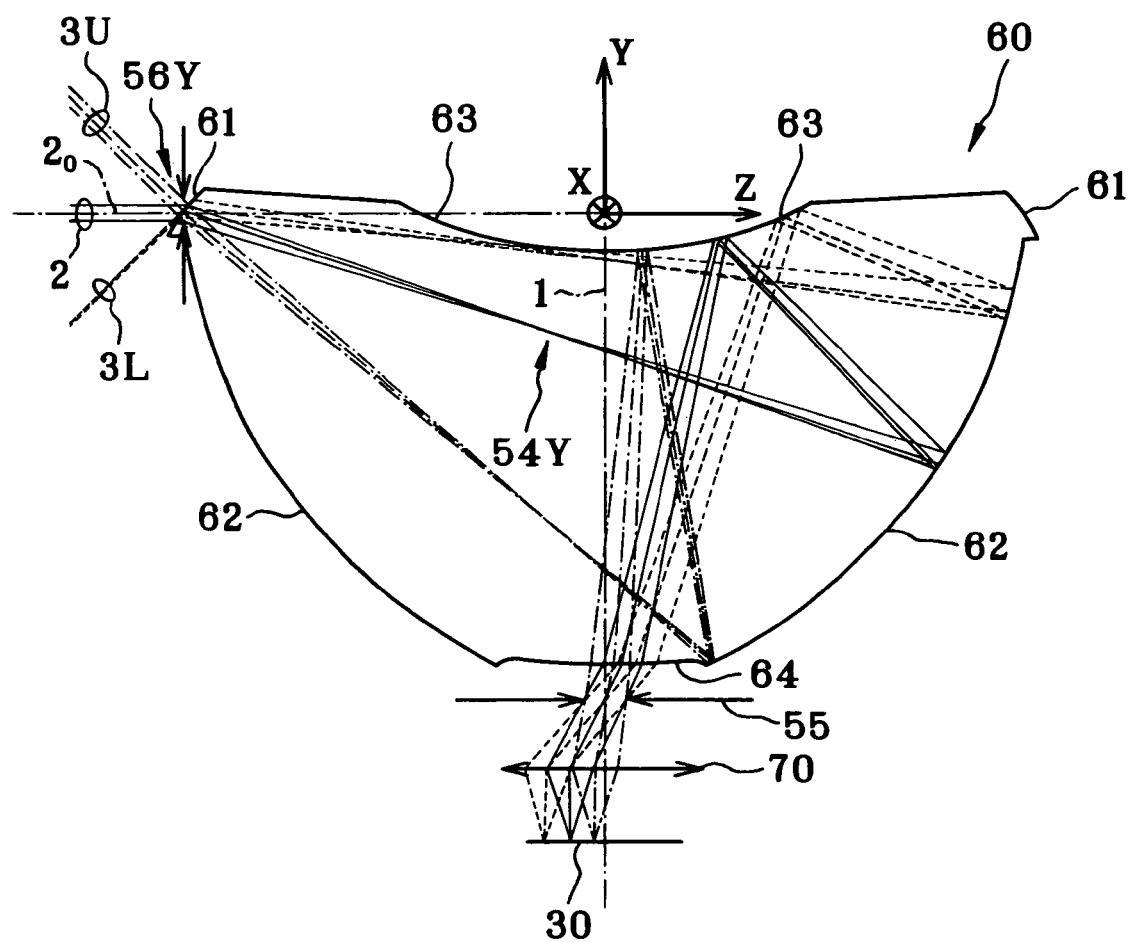
FIG. 15 is a sectional view of the panoramic optical system of Example 6 of the invention, as taken along its center axis.
Figure 16A:
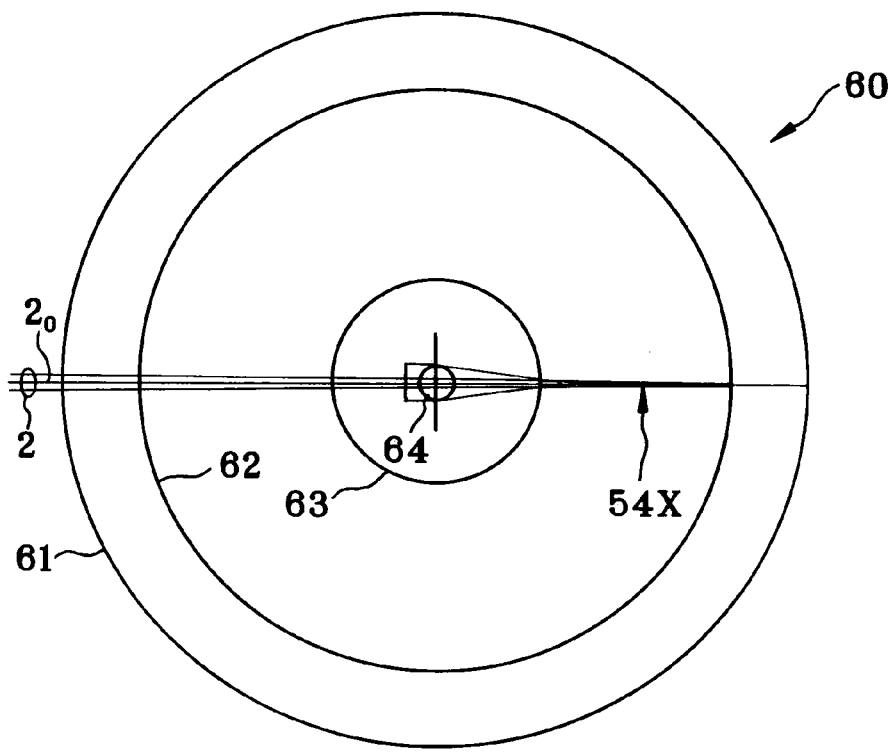
FIG. 16 is a plan view of an optical path through the optical system of Example 6 of the invention.
Figure 16B:
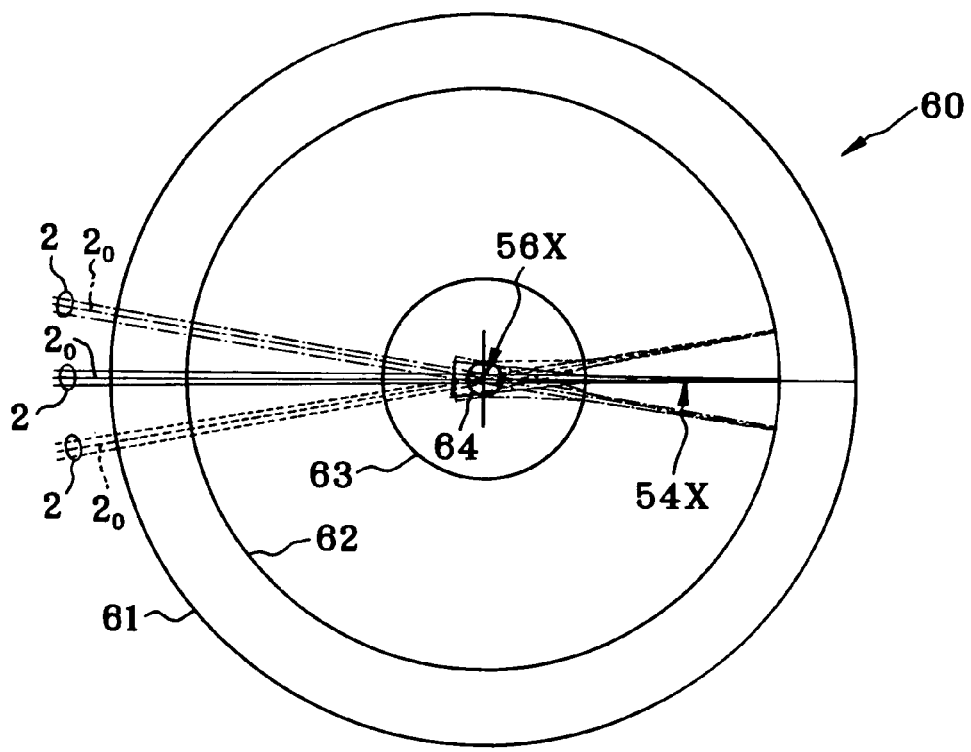
Figure 17:
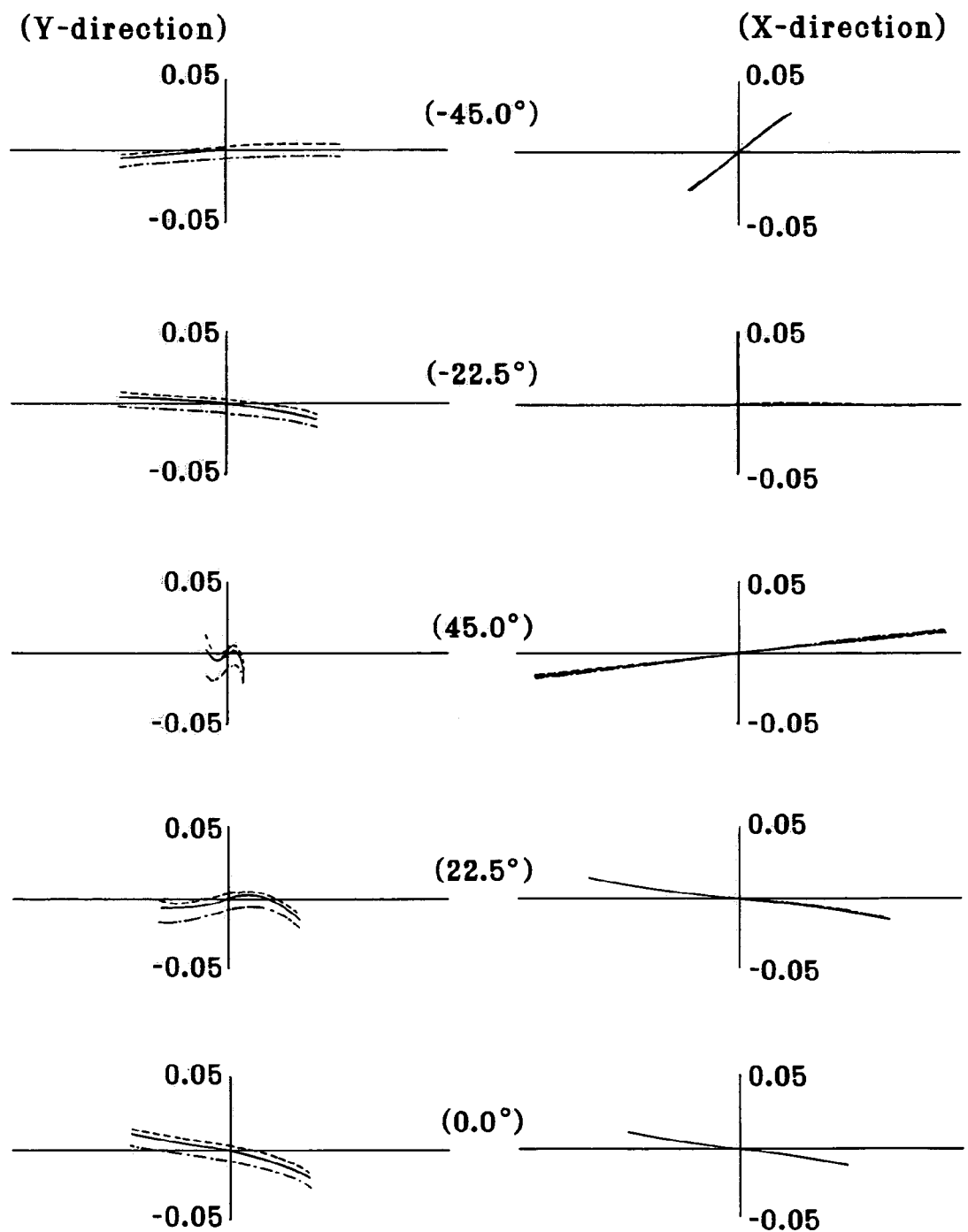
FIG. 17 is a transverse aberration diagram for the whole optical system of Example 6.

FIG. 15 is a sectional view, similar to FIG. 7, of the panoramic optical system of Example 6, as taken along a center axis 1 (axis of rotational symmetry), and FIG. 16 is a plan view, similar to FIG. 8, of an optical path through that optical system. FIG. 17 is a transverse aberration diagram, similar to FIG. 9, for this example.

The panoramic optical system of this example is similar in construction to Example 4 with the exception that the second transmitting surface 64 in the transparent medium of the front unit 60 is composed of an aspheric surface rotationally symmetric about the center axis 1 in place of the extended rotation free-form surface. Example 6 works as in Example 4. In this example, however, an intermediate image-formation position 54Y in the section including the center axis 1 is positioned between the first transmitting surface 61 and the first reflecting surface 62.

The specifications of Example 6 are:
Focal length of the ideal lens 70: 3.5 mm,
Horizontal angle of view: 360°,
Vertical angle of view: 90°,
Entrance pupil diameter: 1.6 mm, and
Image size: ϕ5.99 to ϕ1.07 mm.

Figure 18:
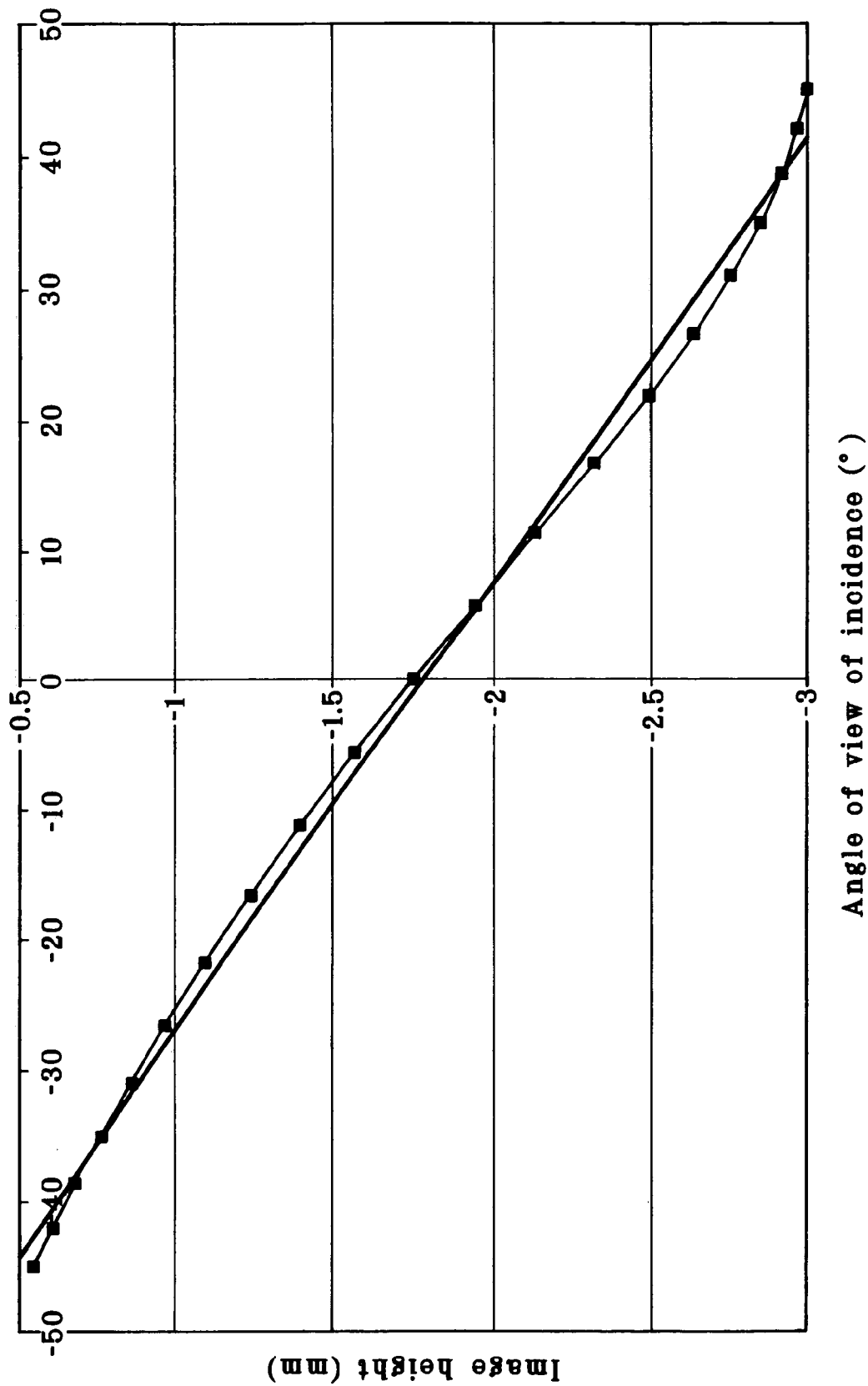
FIG. 18 is indicative of distortion of Example 6 in the vertical direction.

FIG. 18 is illustrative of vertical distortion in this example, wherein a curve running through ■ and a solid line have the same meanings as in FIG. 10.

The constructional parameters in Examples 4, 5 and 6 are set out below, wherein the acronyms "ASS", "ERFS", "IDL" and "RE" indicate an aspheric surface, an extended rotation free-form surface, an ideal lens, and a reflecting surface, respectively.

Example 4

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] | | (2) | 1.5163 | 64.1 |
| 3 | ERFS[2] (RE) | | (3) | 1.5163 | 64.1 |
| 4 | ERFS[3] (RE) | | (4) | 1.5163 | 64.1 |
| 5 | ERFS[4] | | (5) | | |
| 6 | ∞(Stop) | | (6) | | |
| 7 | IDL | | (7) | | |
| Image plane | ∞ | | (8) | | |

-continued

| ERFS[1] | |
|---|---|
| RY | 41.46 |
| θ | −45.73 |
| R | −18.38 |

| ERFS[2] | |
|---|---|
| RY | −35.86 |
| θ | −44.77 |
| R | 13.39 |

| ERFS[3] | |
|---|---|
| RY | −49.48 |
| θ | −88.49 |
| R | 8.62 |

| ERFS[4] | |
|---|---|
| RY | −16.67 |
| θ | −83.30 |
| R | 3.21 |

| Displacement and tilt(1) | | | | | |
|---|---|---|---|---|---|
| X | 0.00 | Y | 0.00 | Z | −18.33 |
| α | 0.00 | β | 0.00 | γ | 0.00 |

| Displacement and tilt(2) | | | | | |
|---|---|---|---|---|---|
| X | 0.00 | Y | 0.00 | Z | 0.00 |
| α | 0.00 | β | 0.00 | γ | 0.00 |

| Displacement and tilt(3) | | | | | |
|---|---|---|---|---|---|
| X | 0.00 | Y | −10.07 | Z | 0.00 |
| α | 0.00 | β | 0.00 | γ | 0.00 |

| Displacement and tilt(4) | | | | | |
|---|---|---|---|---|---|
| X | 0.00 | Y | 4.57 | Z | 0.00 |
| α | 0.00 | β | 0.00 | γ | 0.00 |

| Displacement and tilt(5) | | | | | |
|---|---|---|---|---|---|
| X | 0.00 | Y | −15.57 | Z | 0.00 |
| α | 0.00 | β | 0.00 | γ | 0.00 |

| Displacement and tilt(6) | | | | | |
|---|---|---|---|---|---|
| X | 0.00 | Y | −21.65 | Z | 0.00 |
| α | −90.00 | β | 0.00 | γ | 0.00 |

| Displacement and tilt(7) | | | | | |
|---|---|---|---|---|---|
| X | 0.00 | Y | −25.15 | Z | 0.00 |
| α | −90.00 | β | 0.00 | γ | 0.00 |

| Displacement and tilt(8) | | | | | |
|---|---|---|---|---|---|
| X | 0.00 | Y | −29.06 | Z | 0.00 |
| α | −90.00 | β | 0.00 | γ | 0.00 |

Example 5

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] | | (2) | 1.5163 | 64.1 |
| 3 | ERFS[2] (RE) | | (3) | 1.5163 | 64.1 |
| 4 | ERFS[3] (RE) | | (4) | 1.5163 | 64.1 |
| 5 | ASS[1] | | (5) | | |
| 6 | ∞(Stop) | | (6) | | |
| 7 | −10.23 | | (7) | 1.5208 | 67.0 |
| 8 | −4.76 | | (8) | | |
| 9 | −27.34 | | (9) | 1.6038 | 61.2 |
| 10 | −3.06 | | (10) | 1.7552 | 27.6 |
| 11 | −4.23 | | (11) | | |
| 12 | 6.25 | | (12) | 1.4979 | 69.3 |
| 13 | −4.40 | | (13) | 1.7509 | 32.2 |
| 14 | 14.03 | | (14) | | |
| Image plane | ∞ | | (15) | | |

-continued

| ERFS[1] | |
|---|---|
| RY | 12.80 |
| θ | −37.53 |
| R | −17.20 |
| $C_4$ | $5.6233 \times 10^{-4}$ |

| ERFS[2] | |
|---|---|
| RY | −540.67 |
| θ | −42.20 |
| R | 12.04 |
| $C_3$ | $-1.2313 \times 10^{-2}$ |
| $C_4$ | $9.0272 \times 10^{-6}$ |
| $C_5$ | $-4.1194 \times 10^{-6}$ |

| ERFS[3] | |
|---|---|
| RY | −18.83 |
| θ | −86.79 |
| R | 5.54 |
| $C_3$ | $2.2700 \times 10^{-2}$ |
| $C_4$ | $-4.8733 \times 10^{-5}$ |
| $C_5$ | $3.9655 \times 10^{-6}$ |

| ASS[1] | |
|---|---|
| R | −60.87 |
| k | 0.0000 |
| a | $7.5446 \times 10^{-3}$ |

Displacement and tilt(1)

| X | 0.00 | Y | 0.00 | Z | −17.20 |
|---|---|---|---|---|---|
| α | 0.00 | β | 0.00 | γ | 0.00 |

Displacement and tilt(2)

| X | 0.00 | Y | 0.00 | Z | 0.00 |
|---|---|---|---|---|---|
| α | 0.00 | β | 0.00 | γ | 0.00 |

Displacement and tilt(3)

| X | 0.00 | Y | −7.22 | Z | 0.00 |
|---|---|---|---|---|---|
| α | 0.00 | β | 0.00 | γ | 0.00 |

Displacement and tilt(4)

| X | 0.00 | Y | 11.14 | Z | 0.00 |
|---|---|---|---|---|---|
| α | 0.00 | β | 0.00 | γ | 0.00 |

Displacement and tilt(5)

| X | 0.00 | Y | −11.92 | Z | 0.00 |
|---|---|---|---|---|---|
| α | −90.00 | β | 0.00 | γ | 0.00 |

Displacement and tilt(6)

| X | 0.00 | Y | −12.42 | Z | 0.00 |
|---|---|---|---|---|---|
| α | −90.00 | β | 0.00 | γ | 0.00 |

Displacement and tilt(7)

| X | 0.00 | Y | −12.92 | Z | 0.00 |
|---|---|---|---|---|---|
| α | −90.00 | β | 0.00 | γ | 0.00 |

Displacement and tilt(8)

| X | 0.00 | Y | −14.58 | Z | 0.00 |
|---|---|---|---|---|---|
| α | −90.00 | β | 0.00 | γ | 0.00 |

Displacement and tilt(9)

| X | 0.00 | Y | −14.68 | Z | 0.00 |
|---|---|---|---|---|---|
| α | −90.00 | β | 0.00 | γ | 0.00 |

Displacement and tilt(10)

| X | 0.00 | Y | −16.18 | Z | 0.00 |
|---|---|---|---|---|---|
| α | −90.00 | β | 0.00 | γ | 0.00 |

Displacement and tilt(11)

| X | 0.00 | Y | −17.18 | Z | 0.00 |
|---|---|---|---|---|---|
| α | −90.00 | β | 0.00 | γ | 0.00 |

Displacement and tilt(12)

| X | 0.00 | Y | −17.28 | Z | 0.00 |
|---|---|---|---|---|---|
| α | −90.00 | β | 0.00 | γ | 0.00 |

Displacement and tilt(13)

| X | 0.00 | Y | −19.78 | Z | 0.00 |
|---|---|---|---|---|---|
| α | −90.00 | β | 0.00 | γ | 0.00 |

Displacement and tilt(14)

| X | 0.00 | Y | −20.78 | Z | 0.00 |
|---|---|---|---|---|---|
| α | −90.00 | β | 0.00 | γ | 0.00 |

Displacement and tilt(15)

| X | 0.00 | Y | −24.07 | Z | 0.00 |
|---|---|---|---|---|---|
| α | −90.00 | β | 0.00 | γ | 0.00 |

Example 6

| Surface No. | Radius of curvature | Surface separation | Displacement and tilt | Refractive index | Abbe's No. |
|---|---|---|---|---|---|
| Object plane | ∞ | ∞ | | | |
| 1 | ∞(Entrance Pupil) | | (1) | | |
| 2 | ERFS[1] | | (2) | 1.8830 | 40.7 |
| 3 | ERFS[2] (RE) | | (3) | 1.8830 | 40.7 |
| 4 | ERFS[3] (RE) | | (4) | 1.8830 | 40.7 |
| 5 | ASS[1] | | (5) | | |
| 6 | ∞(Stop) | | (6) | | |
| 7 | IDL | | (7) | | |
| Image plane | ∞ | | (8) | | |

| ERFS[1] | |
|---|---|
| RY | 12.47 |
| θ | −38.00 |
| R | −20.95 |
| $C_4$ | $-1.2785 \times 10^{-2}$ |

| ERFS[2] | |
|---|---|
| RY | −99.34 |
| θ | −32.95 |
| R | 16.64 |
| $C_3$ | $-1.1833 \times 10^{-2}$ |
| $C_4$ | $-5.6247 \times 10^{-5}$ |
| $C_5$ | $-5.4053 \times 10^{-6}$ |

| ERFS[3] | |
|---|---|
| RY | 12.80 |
| θ | −74.74 |
| R | 5.77 |
| $C_3$ | $-1.5794 \times 10^{-2}$ |
| $C_4$ | $5.5281 \times 10^{-4}$ |
| $C_5$ | $6.5482 \times 10^{-6}$ |

| ASS[1] | |
|---|---|
| R | −23.54 |
| k | 0.0000 |
| a | $4.5285 \times 10^{-4}$ |

Displacement and tilt(1)

| X | 0.00 | Y | 0.00 | Z | −20.99 |
|---|---|---|---|---|---|
| α | 0.00 | β | 0.00 | γ | 0.00 |

Displacement and tilt(2)

| X | 0.00 | Y | 0.00 | Z | 0.00 |
|---|---|---|---|---|---|
| α | 0.00 | β | 0.00 | γ | 0.00 |

Displacement and tilt(3)

| X | 0.00 | Y | −12.92 | Z | 0.00 |
|---|---|---|---|---|---|
| α | 0.00 | β | 0.00 | γ | 0.00 |

Displacement and tilt(4)

| X | 0.00 | Y | −1.29 | Z | 0.00 |
|---|---|---|---|---|---|
| α | 0.00 | β | 0.00 | γ | 0.00 |

Displacement and tilt(5)

| X | 0.00 | Y | −23.39 | Z | 0.00 |
|---|---|---|---|---|---|
| α | −90.00 | β | 0.00 | γ | 0.00 |

-continued

| | | Displacement and tilt(6) | | | |
|---|---|---|---|---|---|
| X | 0.00 | Y | −25.25 | Z | 0.00 |
| α | −90.00 | β | 0.00 | γ | 0.00 |
| | | Displacement and tilt(7) | | | |
| X | 0.00 | Y | −28.75 | Z | 0.00 |
| α | −90.00 | β | 0.00 | γ | 0.00 |
| | | Displacement and tilt(8) | | | |
| X | 0.00 | Y | −32.62 | Z | 0.00 |
| α | −90.00 | β | 0.00 | γ | 0.00 |

Figure 19:
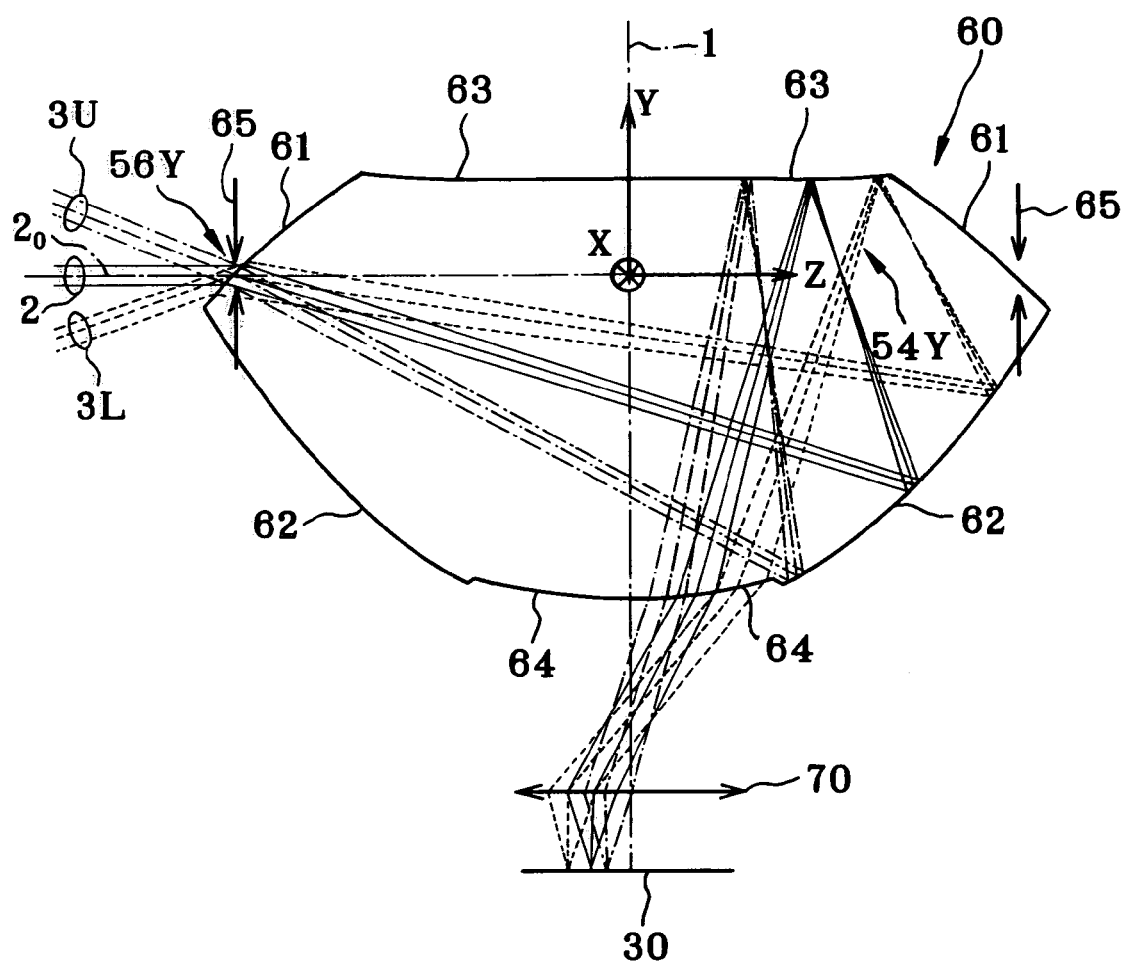
FIG. 19 is a sectional view of one modification to Example 4, as taking along its center axis.
Figure 20:
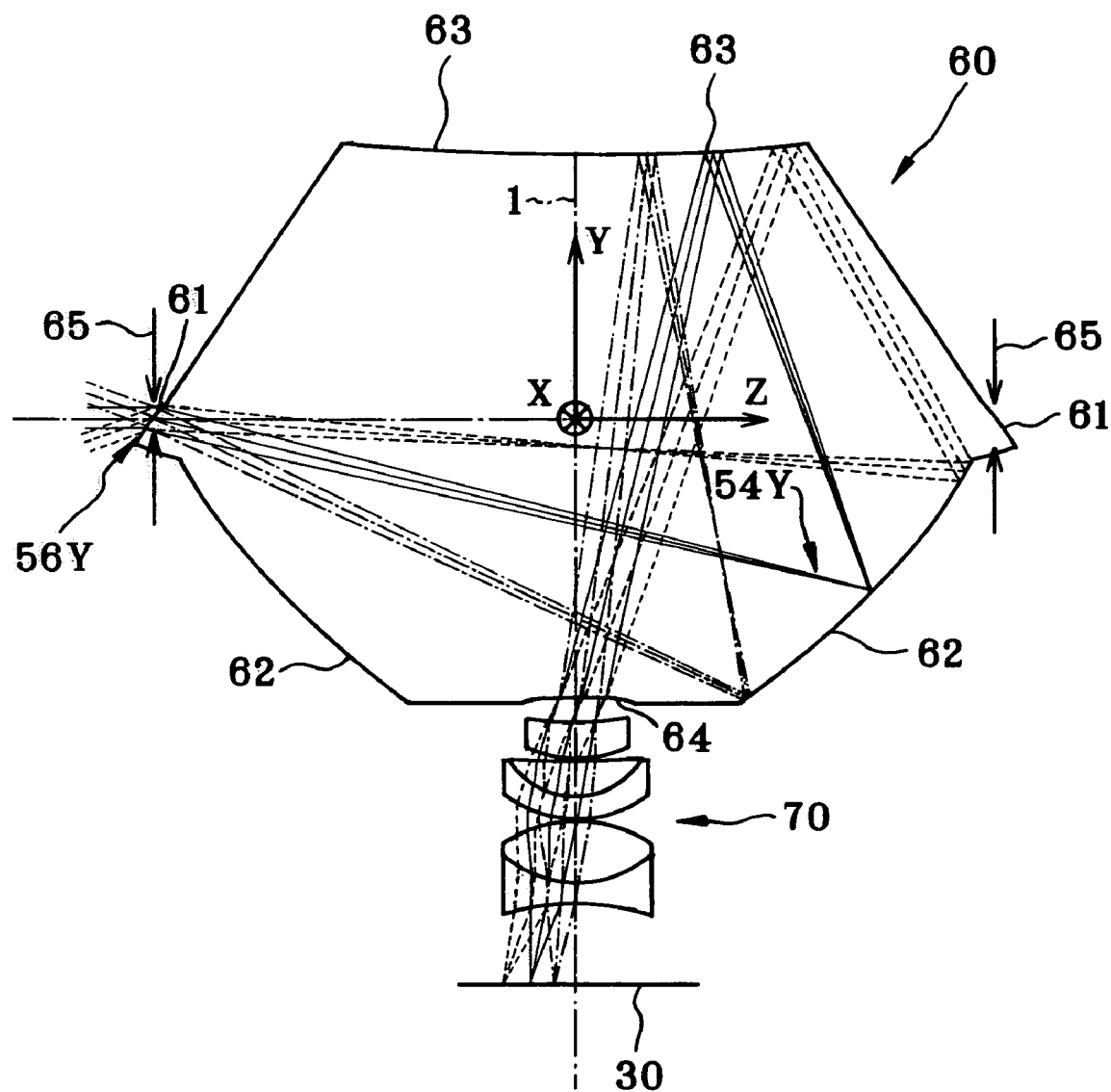
FIG. 20 is a sectional view of one modification to Example 5, as taking along its center axis.
Figure 21:
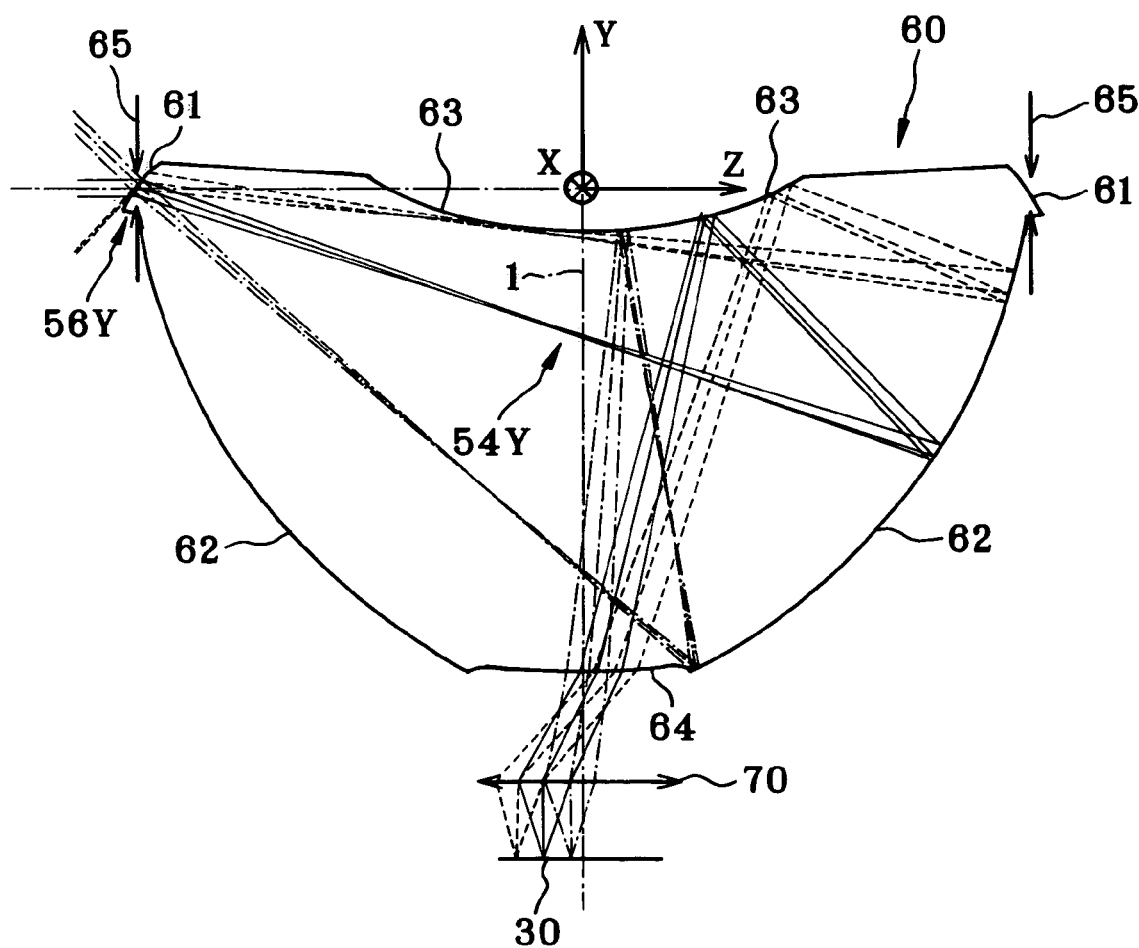
FIG. 21 is a sectional view of one modification to Example 6, as taking along its center axis.

In the aforesaid examples, while between the front unit 60 and the rear unit 70 the aperture 55 is located coaxially to the center axis 1, the entrance pupil 56Y in the plane including the center axis 1 is formed at or near the first transmitting surface 61 by back projection of the aperture 55 onto the object side in the plane including the center axis 1. Instead of this aperture 55, however, it is acceptable to locate a cylindrical or zonal slit 65 coaxial to the center axis 1 at or near the first transmitting surface 61, as exemplified in modifications to Examples 1, 2 and 3 shown in FIGS. 19, 20 and 21, respectively. In that case, the slit 65 acts by itself as a front stop for the formation of the entrance pupil 56Y. The cylindrical or zonal slit 65 also works as a flare stop. As a matter of course, such a slit 65 could be used in combination with the aperture 55 located at any position on the image plane 30 side of the front unit 60. It is here to be noted that even though the aperture 55 is not located at any position on the image plane 30 side of the front unit 60, the entrance pupil 56Y in the plane that is orthogonal to the plane including the center axis 1 and includes the center light ray $2_0$ is formed by back projection of a frame or the like of the lens system that forms the rear unit 70.

Further, in the above-exemplified optical systems, it is possible to make the angle of view wider in a sectional direction including the axis 1 of rotational symmetry, if a Y-toric lens is added to the object side of the front unit 60. It is here to be noted that the Y-toric lens should be configured of a surface rotationally symmetric with respect to the Y-axis (the center axis 1) while it has no power in the X-direction but yet has negative power in the Y-direction (a section of FIG. 7 or the like). More preferably, the toric lens should be configured into a negative meniscus lens shape that is convex on the object side in the Y-Z section, thereby minimizing image distortion and making better correction for aberrations.

Furthermore, if the front unit 60 is provided on its object side with one Y-toric lens of negative meniscus shape in section plus two or three lenses of meniscus shape, it is possible to reduce image distortion as much as possible. If an additional reflecting surface or prism rotationally symmetric with respect to the center axis 1 is provided, it is easy to observe or pick up images in any direction by reflection and refraction of light rays.

In the aforesaid examples, vertical distortion is brought close to f·θ where IH ∝ f·θ (Example 5 in particular). To bring that close to f·tan θ (IH ∝ f·tan θ), however, it is preferable to make correction with higher-order odd-number terms applied to the reflecting surfaces 62 and 63 in particular.

In the foregoing examples, each reflecting surface, and each refracting surface in the front unit 60 is composed of a rotationally symmetric aspheric surface having a vertex on the axis 1 of rotational symmetry or an extended rotation free-form surface that is formed by rotation of a line segment of any shape about the axis 1 of rotational and has no vertex on the axis 1 of rotational symmetry; however, it is easy to replace them by any desired curved surfaces.

The optical system of the invention also makes correction for an image plane tilt occurring by decentration and pupil aberrations of the stop upon back projection by making use of the formula that defines a line segment of any shape with an odd-number order term incorporated in it. The odd-number order term for the first reflecting surface is particularly important, and allowing this to have a positive value is required for correction of decentration aberrations occurring by de-centration. For correction of aberrations it is also preferable to make the Y-Z direction curvature tight (make the radius of curvature small) in the Y-axis positive direction (on the opposite side to the image plane).

By immediate use of the transparent medium that forms the front unit 60 according to the invention and is rotationally symmetric about the center axis 1, images having a full 360°-direction angle of view may be taken or projected. However, it is acceptable to cut that transparent medium along a section including the center axis 1 into ½, ⅓, ⅔, etc. for the purpose of taking or projecting an image having an angle of view of 180°, 120°, 240°, etc.

While the panoramic optical system (embracing a panoramic attachment optical system and image-formation lens combination) has been described with reference to an imaging or viewing optical system for obtaining an image having a full 360°-direction angle of view (a full-panoramic image) including the zenith with the center axis 1 (axis of rotational symmetry) lying in the vertical direction, it is understood that the invention is equally applicable to a projection optical system in which the optical path is the other way around to project an image at a full 360°-direction (full-panoramic) angle of view. An endoscope could be used as a full-panoramic viewing optical system for in-tract viewing apparatus.

Figure 22A:
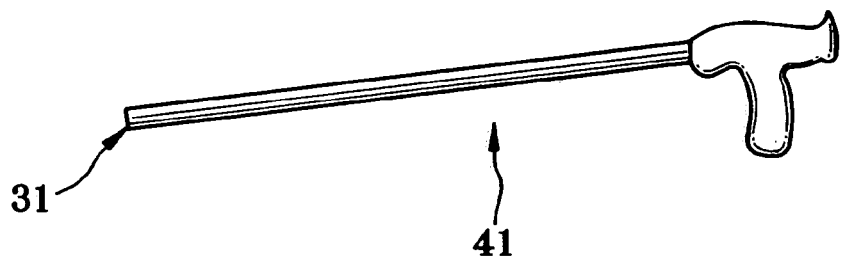
FIG. 22 is illustrative of an example of using the panoramic taking optical system of the invention as a taking optical system at the endmost portion of an endoscope.
Figure 22B:
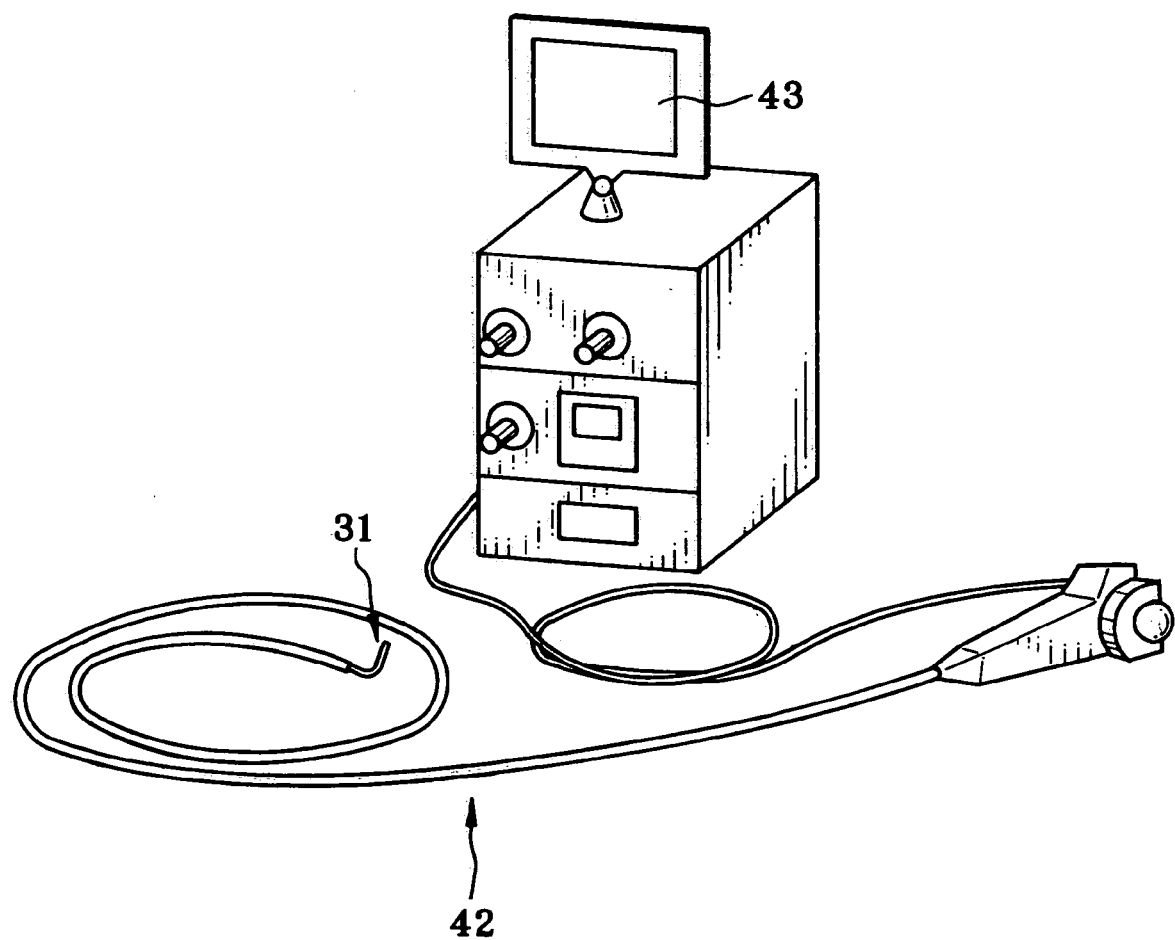

How to use a panoramic taking optical system 31 or panoramic projection optical system 32 is now explained as a typical example of application of the panoramic optical system of the invention. FIG. 22 is generally illustrative of an example of the panoramic taking optical system 31 of the invention used as a taking optical system attached to the endmost portion of an endoscope. More specifically, FIG. 22(*a*) is illustrative of the panoramic taking optical system 31 of the invention that is attached to the endmost portion of a hard endoscope 41 to take and view a full 360°-direction image, and FIG. 22(*b*). is illustrative of the panoramic taking optical system 31 of the invention that is attached to the endmost portion of a soft electronic endoscope 42 to display a taken image on a display 43 after image processing for correction of distortion.

Figure 23:
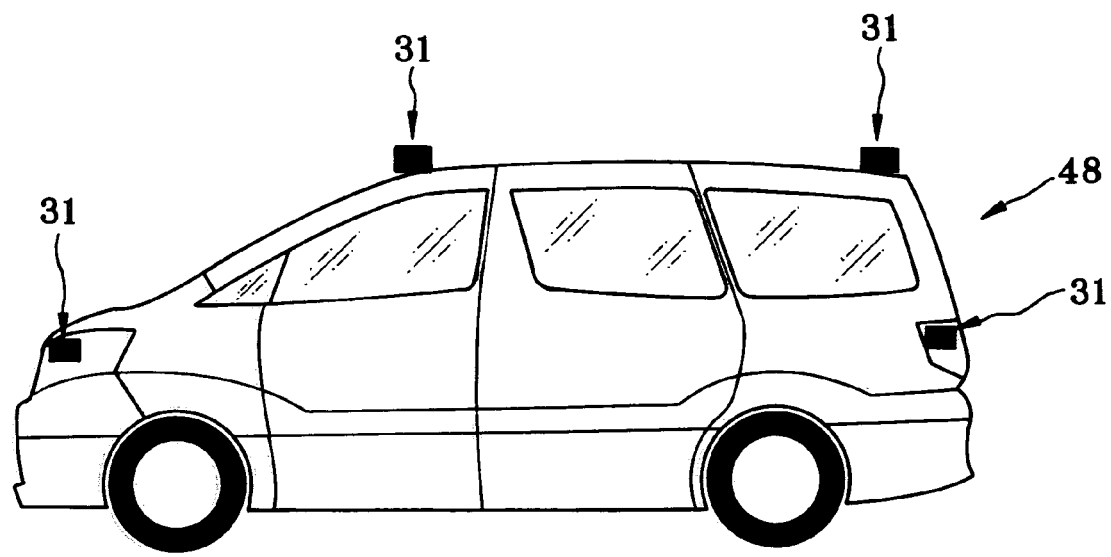
FIG. 23 is illustrative of one example of using the panoramic taking optical system of the invention as taking optical systems at the corners and ceiling of a car.

FIG. 23 is illustrative of a plurality of panoramic taking optical systems 31 of the invention that are attached to the corners and ceiling of a car 48 as taking optical systems to display images taken via the panoramic taking optical systems 31 simultaneously on an interior display after image processing for correction of distortion.

Figure 24:
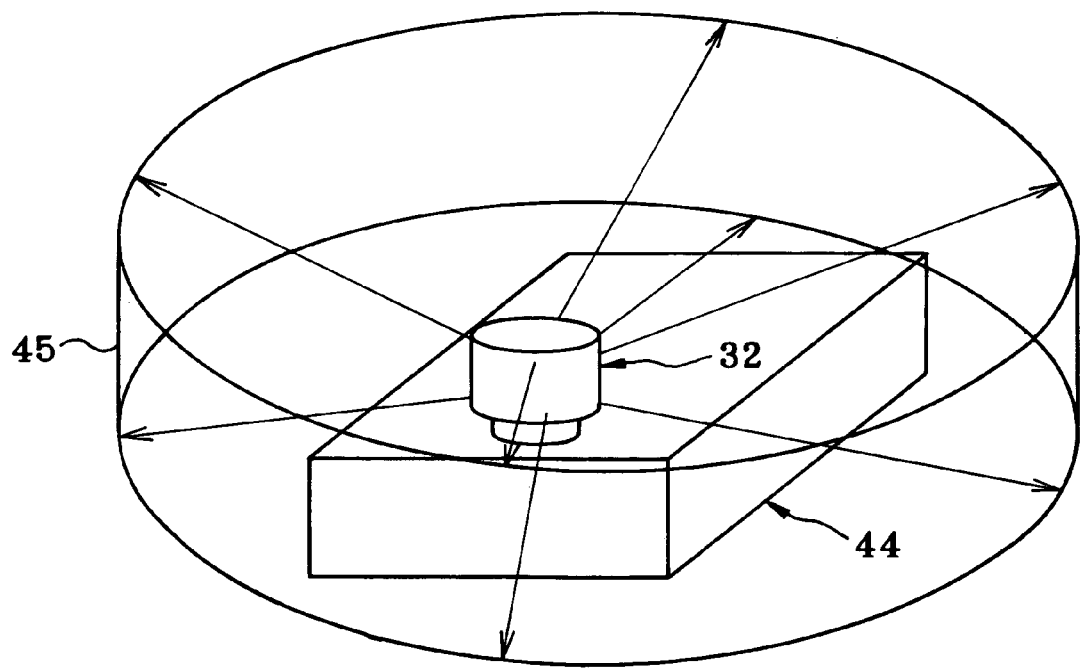
FIG. 24 is illustrative of one example of using the panoramic projection optical system as a projection optical system in a projector.

FIG. 24 is illustrative of an example of a projector 44 in which the panoramic projection optical system 32 of the invention is used as its projection optical system. A panoramic image is displayed on a display device located on the image plane of the system 32, so that a full 360°-direction image is projected and displayed on a full 360°-direction screen 45 through the panoramic optical system 32.

Figure 25:
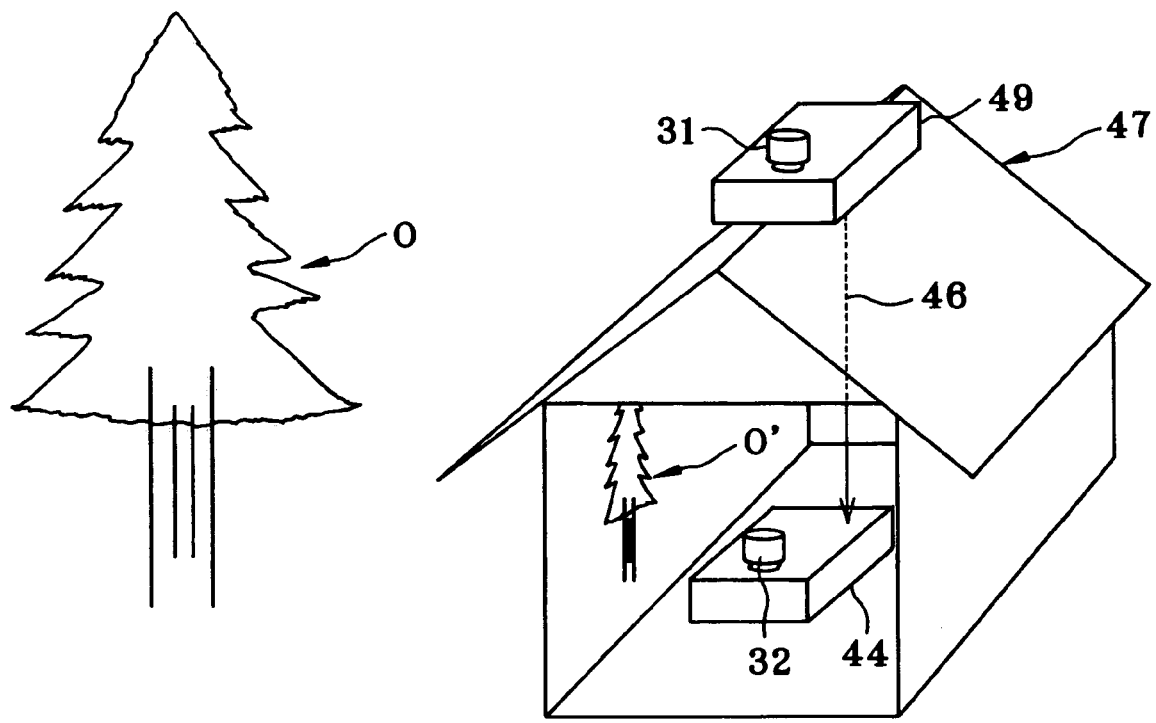
FIG. 25 is illustrative of an example of taking an image of a subject outside a house using the panoramic taking optical system of the invention to project and display it within the house through the panoramic projection optical system of the invention.

FIG. 25 is illustrative of a taking device 49 using the panoramic taking optical system 31 of the invention, which is attached to the outside of a house 47, and a projector 44 using the panoramic projection optical system 32 of the invention, which is located inside. An image picked up by the taking device 49 is sent to the projector 44 via an electric wire 46. Such being the arrangement, a full 360°-direction subject O outside the house is taken by the taking device 49 via the panoramic taking optical system 31, and image signals are sent to the projector 44 via the electric wire 46. An image of the subject is displayed on a display device located on an image plane, so that the image O' of the subject O is projected and displayed on the inside wall surface or the like of the house via the panoramic projection optical system 32.

The invention claimed is:

1. A panoramic attachment optical system, which is attached to an entrance side of an image-formation lens having positive power or an exit side of a projection lens having positive power to form a full 360°-direction image on a an image plane or project an image located on an image plane in a full 360° direction, wherein said panoramic attachment optical system comprises a transparent medium that is rotationally symmetric about a center axis and includes at least two internal reflecting surfaces and at least two refracting surfaces, wherein a light beam enters said transparent medium via an entrance-side refracting surface in order of travel of a light ray in the case of an image-formation optical system, and oppositely to the order of travel of a light ray in the case of a projection optical system, and reflects successively at said internal reflecting surfaces to leave said transparent medium via an exit-side refracting surface, forming an image at a position of said image plane off said center axis via said image-formation lens or said projections lens, said internal reflecting surfaces and said refracting surfaces are each of shape rotationally symmetric about said center axis, and a light beam coming from far away forms an image at least one time in a section including said center axis, and at least one time in a plane that is orthogonal to said section and includes a center light ray of said light beam as well.

2. The panoramic attachment optical system according to claim 1, wherein at least one internal reflecting surface is of rotationally symmetric shape obtained by rotation about said center axis of a line segment that has no plane of symmetry and is of any shape.

3. The panoramic attachment optical system according to claim 1, wherein at least one internal reflecting surface is of rotationally symmetric shape obtained by rotation about said center axis of a line segment that includes an odd-number order term, as expressed by a polynomial, and is of any shape.

4. The panoramic attachment optical system according to claim 1, wherein a center light ray of a center light beam coming from far away has an angle of incidence of 45° or smaller on any of said internal reflecting surfaces.

5. The panoramic attachment optical system according to claim 1, wherein said image-formation lens or said projection lens and a pupil-formation aperture are located coaxially to said center axis.

6. The panoramic attachment optical system according to claim 1, which satisfies condition (1):

$$5 < |A/B| \quad (1)$$

Where A is an optical path length between a position of an entrance pupil that is an image of said pupil-formation aperture and said pupil-formation aperture, and B is an optical path length between said entrance surface and said position of an entrance pupil.

7. The panoramic attachment optical system according to claim 1, which satisfies condition (2):

$$0.2 < Fx/Fy < 2.0 \quad (2)$$

Where Fx and Fy are focal lengths of the whole panoramic attachment optical system in an X-direction and a Y-direction, respectively, provided that on said image plane, the Y-direction is defined by a direction of a plane including said center axis and the X-direction is defined by a direction orthogonal to said plane.

8. A panoramic optical system for forming an image having a full 360°-direction angle of view on an image plane or projecting an image located on the image plane at a full 360°-direction angle of view, wherein:

said panoramic optical system comprises a front unit comprising a transparent medium rotationally symmetric about a center axis and including at least two reflecting surfaces and two transmitting surfaces, and a rear unit that is rotationally symmetric about the center axis and has positive refracting power, said front unit includes a first transmitting surface on which a light beam coming from far away is incident in order of travel of light rays in the case of an image-formation system, and oppositely to the order of travel of light rays in the case of a projection system, a first reflecting surface opposite to said first transmitting surface with said center axis interposed therebetween, a second reflecting surface located on the same side as said first reflecting surface and a second transmitting surface that faces said rear unit, wherein a center of said first reflecting surface is positioned nearer to said rear unit side than a center of said second reflecting surface as viewed in a center axis direction, and a light beam coming from far away enters said front unit, exits said front unit, and enters said rear unit, forming an image at a position of an image plane off said center axis, wherein in a section including said center axis, an entrance pupil is positioned at or near said first transmitting surface and in a plane that is orthogonal to said section including said center axis and includes a center light ray of said light beam, said entrance pupil is positioned on said center axis.

9. The panoramic optical system according to claim 8, wherein at any position of an image plane side with respect to said front unit, there is provided an aperture located coaxially to said center axis.

10. The panoramic optical system according to claim 8, wherein at or near said first transmitting surface in said front unit, there is provided a zonal slit aperture rotationally symmetric about said center axis.

11. The panoramic optical system according to claim 8, wherein at least one internal reflecting surface is of rotationally symmetric shape obtained by rotation about said center axis of a line segment that has no plane of symmetry and is of any shape.

12. The panoramic attachment optical system according to claim 8, wherein at least one internal reflecting surface is of rotationally symmetric shape obtained by rotation about said center axis of a line segment that includes an odd-number order term and is of any shape.

13. The panoramic attachment optical system according to claim 8, wherein a flare stop for limiting an aperture only in said section including said center axis is located at or near said entrance pupil.

14. The panoramic attachment optical system according to claim 8, wherein said rear unit comprises a rotationally symmetric, co-axial refracting optical system.

15. The panoramic attachment optical system according to claim 8, which satisfies condition (3):

$$F_{fx}/F_{fy} < 0.95 \tag{3}$$

where $F_{fx}$ is a focal length of said front unit in a plane including said center axis, and $F_{fy}$ is a focal length of said front unit in a plane orthogonal to said center axis.

16. The panoramic attachment optical system according to claim 8, which satisfies condition (7):

$$5 < |A/B| \tag{7}$$

where, in said section including said center axis, A is an optical path length from a position of an entrance pupil to a stop position, and B is an optical path length from said position of an entrance pupil to said first transmitting surface in said front unit provided that a light ray direction is positive.

17. The panoramic attachment optical system according to claim 8, which satisfies condition (8):

$$0.1 < C/D < 10 \tag{8}$$

where, in said section including said center axis, C is a distance of said entrance pupil from said center axis and D is a distance of said flare stop from said center axis.

18. The panoramic attachment optical system according to claim 8, wherein at least one said transparent medium is cut along said section including said center axis so that an angle of view around said center axis is narrower than 360°.

* * * * *